US011172205B2

(12) United States Patent
Toma et al.

(10) Patent No.: US 11,172,205 B2
(45) Date of Patent: Nov. 9, 2021

(54) IMAGE ENCODING METHOD, IMAGE DECODING METHOD, IMAGE ENCODING APPARATUS, AND IMAGE DECODING APPARATUS

(71) Applicant: Panasonic Corporation, Osaka (JP)

(72) Inventors: Tadamasa Toma, Osaka (JP); Takahiro Nishi, Nara (JP); Kengo Terada, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 16/580,506

(22) Filed: Sep. 24, 2019

(65) Prior Publication Data

US 2020/0021816 A1  Jan. 16, 2020

Related U.S. Application Data

(63) Continuation of application No. 15/059,567, filed on Mar. 3, 2016, now Pat. No. 10,469,858, which is a
(Continued)

(30) Foreign Application Priority Data

Oct. 2, 2014 (JP) ................. 2014-204340

(51) Int. Cl.
*H04N 19/156* (2014.01)
*H04N 19/172* (2014.01)
(Continued)

(52) U.S. Cl.
CPC ......... *H04N 19/156* (2014.11); *H04N 19/164* (2014.11); *H04N 19/172* (2014.11);
(Continued)

(58) Field of Classification Search
CPC .... H04N 19/172; H04N 19/587; H04N 19/31; H04N 19/70; H04N 19/46; H04N 19/187;
(Continued)

(56) References Cited

U.S. PATENT DOCUMENTS 9,124,757 B2 * 9/2015 Weber .................... H04N 19/36
2007/0160137 A1 * 7/2007 Guo ...................... H04N 19/103
375/240.1
(Continued)

FOREIGN PATENT DOCUMENTS

JP    2012-124896    6/2012
JP    2015-065530    4/2015

OTHER PUBLICATIONS

International Search Report of PCT application No. PCT/JP2014/005252 dated Jan. 6, 2015.
(Continued)

Primary Examiner — Neil R Mikeska
(74) Attorney, Agent, or Firm — Wenderoth, Lind & Ponack, L.L.P.

(57) ABSTRACT

An image encoding method includes: determining respective decoding times of a plurality of pictures included in a motion picture such that decoding times of a plurality of lower layer picture which do not belong to a highest layer of a plurality of layers are spaced at regular intervals, and decoding timing for each of the plurality of lower layer pictures is identical between a case where the plurality of encoded pictures included in the motion picture are decoded and a case where only the plurality of lower layer pictures are decoded, encoding each of the plurality of pictures included in the motion picture in accordance with the encoding order according to the determined respective decoding times, and generating an encoded stream including
(Continued)

the plurality of encoded pictures and the determined respective decoding times for the plurality of pictures.

2 Claims, 33 Drawing Sheets

Related U.S. Application Data continuation of application No. PCT/JP2014/005252, filed on Oct. 16, 2014.

(60) Provisional application No. 61/892,697, filed on Oct. 18, 2013.

(51) Int. Cl.
| | |
|---|---|
| *H04N 19/187* | (2014.01) |
| *H04N 19/70* | (2014.01) |
| *H04N 19/31* | (2014.01) |
| *H04N 19/587* | (2014.01) |
| *H04N 19/46* | (2014.01) |
| *H04N 19/164* | (2014.01) |
| *H04N 19/37* | (2014.01) |
| *H04N 19/105* | (2014.01) |

(52) U.S. Cl.
CPC ........... *H04N 19/187* (2014.11); *H04N 19/31* (2014.11); *H04N 19/37* (2014.11); *H04N 19/46* (2014.11); *H04N 19/587* (2014.11); *H04N 19/70* (2014.11); *H04N 19/105* (2014.11)

(58) Field of Classification Search
CPC .... H04N 19/156; H04N 19/37; H04N 19/164; H04N 19/105
See application file for complete search history.

(56) References Cited

U.S. PATENT DOCUMENTS

| | | |
|---|---|---|
| 2007/0206673 A1 | 9/2007 | Cipolli |
| 2009/0161762 A1 | 6/2009 | Jun |
| 2011/0110436 A1 | 5/2011 | Schierl |
| 2011/0280257 A1 | 11/2011 | Chakareski |
| 2012/0016965 A1 | 1/2012 | Chen |
| 2012/0140825 A1 | 6/2012 | Huang et al. |
| 2012/0224626 A1 | 9/2012 | Jang |
| 2016/0234519 A1 | 8/2016 | Terada |
| 2016/0301940 A1 | 10/2016 | Tsukagoshi |
| 2017/0094302 A1 | 3/2017 | Hendry |
| 2017/0127070 A1 | 5/2017 | Suzuki |

OTHER PUBLICATIONS

Benjamin Bross et al., "High Efficiency Video Coding (HEVC) text specification draft 10 (for FDIS & Last Call)", JCTVC-L1003_v34, Jan. 14-23, 2013.

Supplementary European Search Report dated Jul. 7, 2016 in European Application No. 14854396.0.

Y. Yokoyama et al.: Institute of Electrical and Electronics Engineers, "Adaptive GOP Structure Selection for Real-Time MPEG-2 Video Encoding", Proceedings 2000 International Conference on Image Processing. ICIP 2000. Vancouver, Canada, Sep. 10-13, 2000; [International Conference on Image Processing], New York, NY : IEEE, US, vol. CONF. 7, Sep. 10, 2000 (Sep. 10, 2000), pp. 832-835, XP001129135.

R. Sjoberg et al.: "Overview of HEVC high-level syntax and reference picture management", IEEE Transactions on Circuits and Systems for Video Technology, Jan. 1, 2012 (Jan. 1, 2012), pp. 1-14, XP055045360.

H. Schwarz et al.: "Overview of the Scalable Extension of the H.264/MPEG-4 AVC Video Coding Standard", 21. JVT Meeting; 78. MPEG Meeting; Oct. 20-27, 2006; Hangzhou, CN; (Joint Video Team of ISO/IEC JTC1/SC29/WG11 and ITU-T SG.16), No. JVT-U145, Oct. 20, 2006 (Oct. 20, 2006), XP030006791.

* cited by examiner

FIG. 22

| |
|---|
| VIDEO STREAM (PID=0x1011 MAIN VIDEO) |
| AUDIO STREAM (PID=0x1100) |
| AUDIO STREAM (PID=0x1101) |
| PRESENTATION GRAPHICS STREAM (PID=0x1200) |
| PRESENTATION GRAPHICS STREAM (PID=0x1201) |
| INTERACTIVE GRAPHICS STREAM (PID=0x1400) |
| VIDEO STREAM (PID=0x1B00 SUB VIDEO) |
| VIDEO STREAM (PID=0x1B01 SUB VIDEO) |

DATA STRUCTURE OF PMT

*FIG. 33*

| CONFORMING STANDARD | DRIVING FREQUENCY |
|---|---|
| MPEG4.AVC | 500MHz |
| MPEG2 | 350MHz |
| ... | ... |

IMAGE ENCODING METHOD, IMAGE DECODING METHOD, IMAGE ENCODING APPARATUS, AND IMAGE DECODING APPARATUS

BACKGROUND

1. Technical Field

The present disclosure relates to an image encoding method for performing hierarchical encoding of an image, an image decoding method for decoding an image subjected to the hierarchical encoding, and the like.

2. Description of the Related Art

Conventionally, there have been suggested an image encoding method for performing hierarchical encoding of an image and an image decoding method for decoding an encoded image subjected to the hierarchical encoding (for example, see NPL 1).

CITATION LIST

Non Patent Literature

NPL 1: Joint Collaborative Team on Video Coding (JCT-VC) of ITU-T SG16 WP3 and ISO/IEC JTC1/SC29/WG11 12th Meeting: Geneva, CH, 14-23 Jan. 2013 JCTVC-L1003_v34.doc, High Efficiency Video Coding (HEVC) text specification draft 10 (for FDIS & Last Call) http://phenix.it-sudparis.eu/jct/doc_end_user/documents/12_Geneva/wg11/JCTVC-L100 3-v34.zip

SUMMARY

In one general aspect, the techniques disclosed here feature an image encoding method for encoding a motion picture for each picture which belongs to any one of a plurality of layers, without referring to another picture which belongs to a layer higher than the layer to which the picture belongs, the image encoding method including: determining respective decoding times of a plurality of pictures included in the motion picture such that decoding times of a plurality of lower layer pictures which are a portion of the plurality of pictures included in the motion picture and which do not belong to a highest layer of the plurality of layers are spaced at regular intervals, and that decoding timing for each of the plurality of lower layer pictures is identical between a case where the plurality of pictures included in the motion picture which has been encoded are decoded and a case where only the plurality of lower layer pictures are decoded; encoding each of the plurality of pictures included in the motion picture in accordance with an encoding order according to the determined respective decoding times; and generating an encoded stream including the plurality of encoded pictures and the determined respective decoding times for the plurality of pictures.

The image encoding method and the image decoding method according to the present disclosure can suppress the processing load.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF THE DRAWINGS

FIG. 22 is a diagram illustrating a configuration of multiplexed data;

FIG. 33 is a diagram illustrating an example of a lookup table in which a standard of video data and a driving frequency are associated with each other;

DETAILED DESCRIPTION

Findings Forming a Basis of the Present Disclosure

The inventor of the present application has found that the following problems occur in association with NPL 1 described in the "2. Description of the Related Art" section.

In an encoding method such as MPEG-4 AVC (Moving Picture ExpertsGroup-4 Advanced Video Coding) or HEVC (High Efficiency Video Coding), scalability in a temporal direction (hereinafter referred to as temporal scalability) can be realized by hierarchically encoding pictures. For example, when all the pictures are decoded, the pictures can be reproduced at 120 fps, and when only pictures which belong to a particular layer are decoded, the pictures can be reproduced at 60 fps.

By using such temporal scalability, double speed reproduction by decoding only the pictures which belong to the particular layer at an interval of 120 fps can be realized. Further, in a reproduction apparatus that does not support decoding at an interval of 120 fps (hereinafter referred to as 120 fps non-supporting reproduction apparatus), an encoded stream of 120 fps can be possibly reproduced at 60 fps.

Figure 1A:
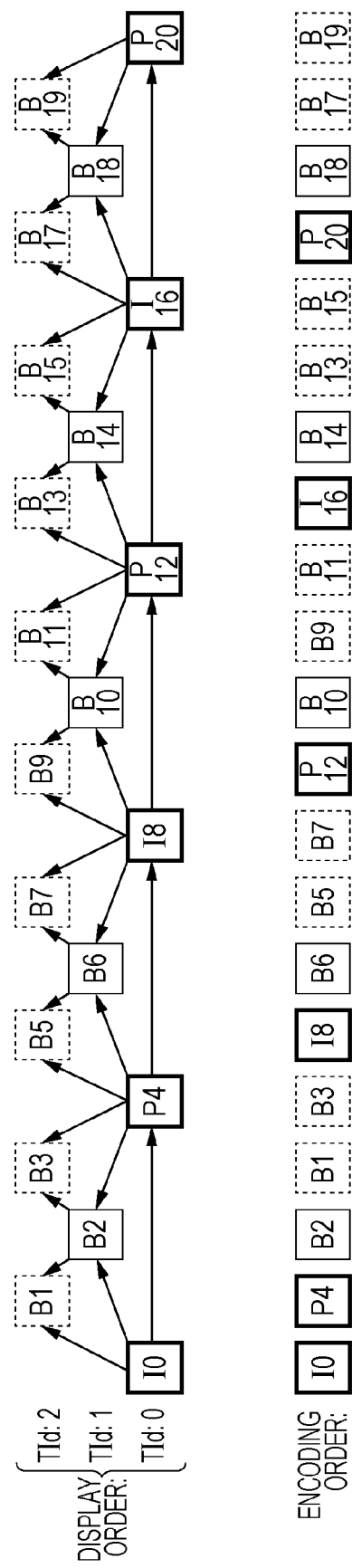
FIG. 1A is a diagram illustrating an example for realizing temporal scalability with HEVC.
Figure 1B:
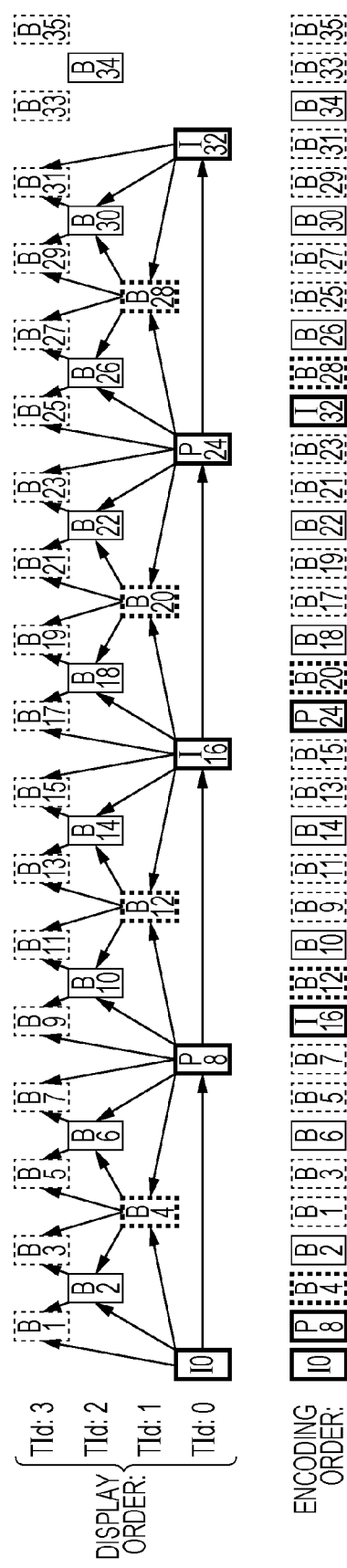
FIG. 1B is a diagram illustrating another example for realizing temporal scalability with HEVC.

FIGS. 1A and 1B are diagrams each illustrating an example for realizing temporal scalability with HEVC. In FIGS. 1A and 1B, a reference relationship between layers and the decoding order (that is, encoding order) of the pictures are illustrated.

FIG. 1A illustrates an example of encoding each picture with a three layer structure. In FIG. 1A, TId is a Temporal ID and denotes an identifier for identifying the layer. Herein, I denotes an I picture (intra-screen prediction picture), P denotes a P picture (for example, forward reference prediction picture), and B denotes a B picture (for example, bidirectional reference prediction picture). A number attached to the right of each of I, P, and B denotes display order of each of the I, P, and B pictures. An arrow indicates a reference relationship between pictures. For example, picture B2 refers to picture I0 and picture P4. More specifically, in a reference relationship between the layers, the picture is encoded without referring to any picture which belongs to a layer higher than the layer to which the picture in question belongs. Instead, the picture is encoded by referring a picture which belongs to the same layer as the layer to which the picture in question belongs, or a picture which belongs to a layer lower than the layer to which the picture in question belongs. Here, when pictures which belong to any one of all the layers with Temporal IDs of 0 to 2 are decoded, a frame rate is 120 fps. In this case, when pictures which belong to any one of the layers with Temporal IDs of 0 and 1 are decoded, a frame rate is 60 fps.

FIG. 1B illustrates an example of encoding each picture with four layer structure. In this case, when the pictures which belong to any one of all the layers with Temporal IDs of 0 to 3 are decoded, a frame rate is 120 fps. In this case also, when the pictures which belong to any one of the layers with Temporal IDs of 0 to 2 are decoded, a frame rate is 60 fps.

As described above, the 120 fps non-supporting reproduction apparatus can possibly realize reproduction of 60 fps by using temporal scalability, and more specifically, the 120 fps non-supporting reproduction apparatus can possibly realize reproduction of 60 fps by decoding only the pictures which belong to some of the layers of the 120 fps encoded stream.

However, even in this case, the 120 fps non-supporting reproduction apparatus may have to decode the pictures at an interval shorter than 1/60 seconds in some cases. Thus, there is a problem in that even if the 120 fps non-supporting reproduction apparatus uses the temporal scalability, the 120 fps non-supporting reproduction apparatus is unable to decode the 120 fps encoded stream because the interval between pictures that are decoded is short.

Figure 2:
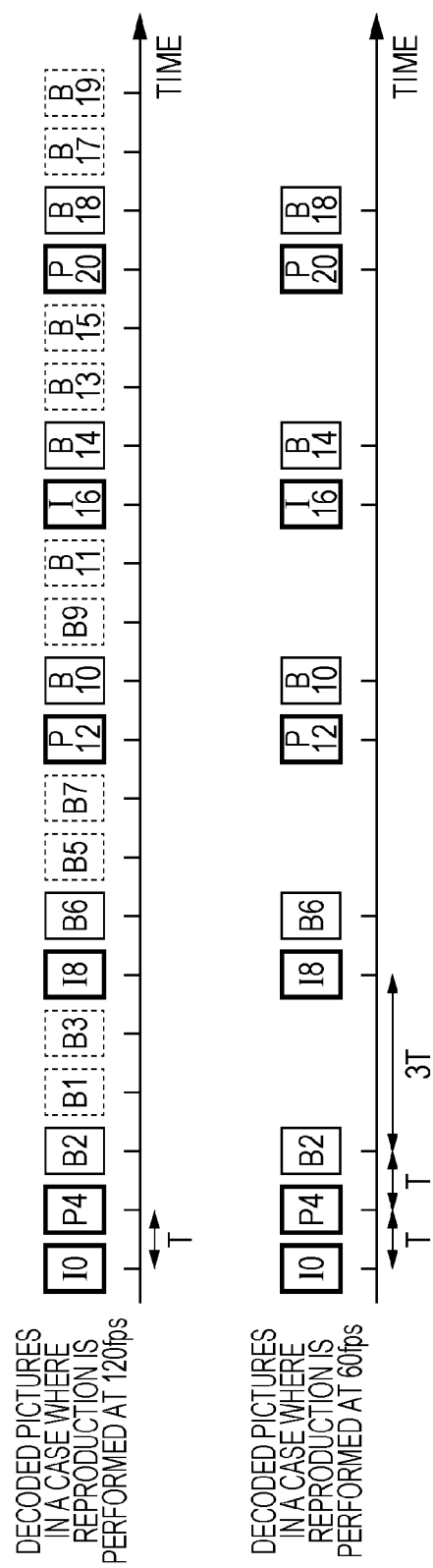
FIG. 2 is a diagram for explaining a problem in that an encoded stream of 120 fps cannot be decoded.

FIG. 2 is a diagram for explaining a problem in that the 120 fps non-supporting reproduction apparatus is unable to decode 120 fps encoded stream. The encoded stream as illustrated in FIG. 2 is the 120 fps encoded stream as illustrated in FIG. 1A. In a case where the 120 fps non-supporting reproduction apparatus reproduces the encoded stream at 60 fps, the 120 fps non-supporting reproduction apparatus decodes only each picture which belongs to the layer with Temporal ID of 0 and each picture which belongs to the layer with Temporal ID of 1.

In FIG. 2, T corresponds to a time corresponding to 120 fps, that is, 1/120 seconds. When broadcasting content and accumulated content are displayed at a fixed frame rate, the decoding is generally performed at a fixed frame rate. Therefore, at the time of the reproduction of 120 fps, both of the interval between the pictures that are decoded (hereinafter referred to as a decoding interval) and the interval during which each picture is displayed (hereinafter referred to as a display interval) are T.

Therefore, even during the reproduction of 60 fps, both of the decoding interval and the display interval need to be the time corresponding to 60 fps, and more specifically, both of the decoding interval and the display interval need to be an interval of 2T. However, as illustrated in FIG. 2, in a case where the reproduction is performed at 60 fps, a decoding interval between Picture I0 and picture P4 or a decoding interval between picture P4 and picture B2 is T. There is a problem in that the 120 fps non-supporting reproduction apparatus which requires a time of 2T as the decoding interval fails to catch up with the decoding of the pictures. More specifically, there is a problem in that the processing load is high in the 120 fps non-supporting reproduction apparatus.

In order to solve such problems, an image encoding method according to one aspect of the present disclosure is an image encoding method for encoding a motion picture for each picture which belongs to any one of a plurality of layers, without referring to another picture which belongs to a layer higher than the layer which the picture in question belongs, the image encoding method including: determining decoding times of a plurality of pictures included in the motion picture such that decoding times of a plurality of lower layer pictures which are some pictures of the plurality of pictures included in the motion picture and which do not belong to a highest layer of the plurality of layers are spaced at regular intervals, and that timing for decoding each of the plurality of lower layer pictures is caused to be identical between a case where a plurality of pictures included in the motion picture which has been encoded are decoded and a case where only the plurality of lower layer pictures of the plurality of pictures are decoded; encoding each of the plurality of pictures included in the motion picture in accordance with encoding order according to the decoding times thus determined; and generating an encoded stream including the plurality of encoded pictures and decoding times that are determined for the plurality of pictures.

Accordingly, each of the plurality of pictures included in the encoded stream is encoded without referring to another picture which belongs to a layer higher than the layer which the picture in question belongs. Therefore, the image decoding apparatus can decode only the plurality of lower layer pictures in the encoded stream. The decoding times of the plurality of lower layer pictures included in the encoded stream are spaced at regular intervals. Therefore, when the image decoding apparatus decodes only the plurality of lower layer pictures in the encoded stream, the image decoding apparatus can decode these lower layer pictures in order at every lapse of regular interval of time. Therefore, by setting the regular interval to an appropriate time, the processing load of the image decoding apparatus can be alleviated. More specifically, the image decoding apparatus can perform decoding at a frame rate according to the processing performance of the image decoding apparatus without performing decoding of each picture at a high frame rate. Further, timing for decoding each of the plurality of lower layer pictures is identical between the case where the plurality of pictures included in the encoded stream (for example, all the pictures) are decoded and the case where only the plurality of lower layer pictures of the plurality of pictures are decoded. Therefore, the image decoding apparatus does not need to change the timing for decoding each of the plurality of lower layer pictures between the case where all the pictures of the encoded stream are decoded and the case where only the plurality of lower layer pictures are decoded. Therefore, the processing load of the image decoding apparatus can be further alleviated.

In the determining of the decoding time, a decoding time of each of a plurality of uppermost layer pictures which are some pictures of the plurality of pictures included in the motion picture and which belong to the highest layer may be determined to be between the decoding times of the plurality of lower layer pictures.

Therefore, when the encoded stream is decoded, the uppermost layer picture and the lower layer picture are alternately decoded. Therefore, any interval of the time for decoding each of the plurality of lower layer pictures in the encoded stream is longer than the interval of the time for decoding each of all the pictures of the decoded stream. As a result, the image decoding apparatus can decode each picture at a surely lower frame rate when the image decoding apparatus decodes only the plurality of lower layer pictures than when the image decoding apparatus decodes each of all the pictures in the decoded stream. Therefore, the processing load of the image decoding apparatus can be reliably alleviated In the determining of the decoding time, the decoding time of each of the plurality of pictures included in the motion picture may be determined such that twice the time of the interval of decoding times of an uppermost layer picture and a lower layer picture which are of the plurality of uppermost layer pictures and the plurality of lower layer pictures and which are continuous in decoding order is equal to the regular interval of time.

Therefore, any interval of the decoding time of each of the plurality of lower layer pictures is the interval of the decoding time of each of an uppermost layer picture and a lower layer picture which are continuous in the decoding order, and more specifically, any interval of the decoding time of each of the plurality of lower layer pictures is twice the interval of the time for decoding each of all the pictures in the decoded stream. Therefore, in a case where a frame rate for decoding and displaying all the pictures of the encoded stream is 120 fps, the image decoding apparatus can decode each of the plurality of lower layer pictures included in the encoded stream at a time interval of a reciprocal of a frame rate of 60 fps without any load.

In a case where the motion picture includes a plurality of random access units including a plurality of pictures which are continuous in the decoding order, in the determining of the decoding time, the decoding time of each picture in each of the random access units may be determined for each of the random access units, such that, in each of the random access units, all the pictures except a picture displayed, in display order, before a picture at a head in decoding order can be decoded without referring to a picture included in another random access unit. For example, the picture at the head is an I picture in which a picture that is after the leading picture in decoding order is prohibited from referring to a picture that is before the leading picture in the decoding order. Alternatively, the leading picture is an I picture in which a picture that is after the leading picture in the decoding order and is before the leading picture in the display order is permitted to refer to a picture that is before the leading picture in the decoding order.

Therefore, for each of the random access units, the image decoding apparatus can appropriately decode each of the plurality of pictures included in the random access unit.

In the determining of the decoding time, in a case where a frame rate at which all the pictures included in the encoded motion picture are decoded and displayed is f, the decoding time of each of all the pictures may be determined such that the decoding time of each of the plurality of lower layer pictures included in all the pictures is spaced apart by a time indicated by n times (n is an integer equal to or more than 2) a reciprocal of the f.

Therefore, the image decoding apparatus can decode each of the plurality of lower layer pictures at a time interval which is n times a reciprocal of that frame rate in order without any load.

The image encoding method may further include incorporating, into the encoded stream, display delay information indicating a display delay which is a time between a decoding time of a picture at a head in decoding order included in the motion picture and a display time of the picture at a head in display order included in the motion picture.

Therefore, the image decoding apparatus can obtain the display delay information from the encoded stream. Therefore, when the image decoding apparatus starts decoding the encoded stream from a time before the display start time by the display delay indicated by the display delay information, the image decoding apparatus can display the motion picture without delay from the display start time.

The image encoding method may further include incorporating, into the encoded stream, non-regular interval information indicating that the decoding times determined for the plurality of pictures included in the motion picture are not spaced at regular intervals.

Therefore, the image decoding apparatus can obtain the non-regular interval information from the encoded stream. Therefore, the image decoding apparatus can determine that each of the plurality of pictures included in the encoded stream cannot be decoded in order at the frame rate of the display. As a result, while the image decoding apparatus refers to the decoding time determined for each of the plurality of pictures included in the encoded stream, the image decoding apparatus can decode the plurality of pictures at appropriate timing.

An image decoding apparatus according to an aspect of the present disclosure is an image decoding method for decoding an encoded stream including a motion picture encoded for each picture which belongs to any one of a plurality of layers, without referring to another picture which belongs to a layer higher than the layer which the picture in question belongs, the image decoding method including: obtaining, from the encoded stream, decoding times of the plurality of pictures included in the encoded stream that are determined such that decoding times of a plurality of lower layer pictures which are some pictures of the plurality of pictures included in the encoded stream and which do not belong to a highest layer of the plurality of layers are spaced at regular intervals, and that timing for decoding each of the plurality of lower layer pictures is caused to be identical between a case where the plurality of pictures included in the encoded stream are decoded and a case where only the plurality of lower layer pictures of the plurality of pictures are decoded; and decoding each of the plurality of pictures included in the encoded stream or the plurality of lower layer pictures in accordance with the obtained decoding times.

Accordingly, each of the plurality of pictures included in the encoded stream is encoded without referring to another picture which belongs to a layer higher than the layer which the picture in question belongs. Therefore, image decoding apparatus can decode only the plurality of lower layer pictures in the encoded stream. The decoding times of the plurality of lower layer pictures included in the encoded stream are spaced at the regular intervals. Therefore, when image decoding apparatus decodes only the plurality of lower layer pictures in the encoded stream, image decoding apparatus can decode the lower layer pictures in order at every lapse of regular interval of time. Therefore, when the regular interval is an appropriate time, the processing load of image decoding apparatus can be alleviated. More specifically, image decoding apparatus can perform decoding at a frame rate according to the processing performance of image decoding apparatus without performing decoding of each picture at a high frame rate. Further, timing for decoding each of the plurality of lower layer pictures is identical between the case where the plurality of pictures included in the encoded stream (for example, all the pictures) are decoded and the case where only the plurality of lower layer pictures of the plurality of pictures are decoded. Therefore, image decoding apparatus does not need to change the timing for decoding each of the plurality of lower layer pictures between the case where all the pictures of the encoded stream are decoded and the case where only the plurality of lower layer pictures are decoded. Therefore, the processing load of image decoding apparatus can be further alleviated.

The image decoding method may further include changing the decoding time of each of the plurality of pictures to have the regular interval in a case where decoding times of the plurality of pictures included in the encoded stream are not spaced at regular intervals; and in the decoding of the encoded stream, decoding each of the plurality of pictures included in the encoded stream or the plurality of lower layer pictures in accordance with the changed decoding time.

Accordingly, for example, the decoding time of each of the plurality of pictures is changed to have the regular interval, and therefore, image decoding apparatus can decode each of the plurality of pictures included in the encoded stream at every lapse of regular interval of time. Therefore, the processing load of image decoding apparatus can be further alleviated.

In the decoding of the encoded stream, a determination is made, for each picture included in the encoded stream, as to whether the decoding time obtained for the picture matches generation timing at which a processing signal is generated at a cycle defined in advance, and when the decoding time is determined to match the generation timing, the picture may be decoded. For example, the image decoding method may further include determining a reciprocal of a frame rate at which all the pictures included in the encoded stream are decoded and displayed to be the cycle defined in advance.

Therefore, even if the decoding times of the plurality of pictures are not spaced at regular intervals, each of the plurality of pictures can be decoded appropriately at the decoding time of the picture.

It should be noted that these general or specific aspects may be implemented using a system, a method, an integrated circuit, a computer program, or a computer-readable recording medium such as a CD-ROM (Compact Disc-Read Only Memory), or using any given combination of a system, a method, an integrated circuit, a computer program, and a computer-readable recording medium.

Hereinafter, exemplary embodiments will be explained in a specific manner with reference to the drawings.

It should be noted that all the exemplary embodiments explained below illustrate comprehensive or specific examples. Numerical values, shapes, materials, constituent elements, disposition positions and connection forms of the constituent elements, steps, the order of the steps, and the like which are shown in the following exemplary embodiments are only examples, and are not intended to limit the present disclosure. Constituent elements in the following exemplary embodiments that are not described in independent claims indicating the broadest concept are explained as optional constituent elements.

FIRST EXEMPLARY EMBODIMENT

Figure 3:
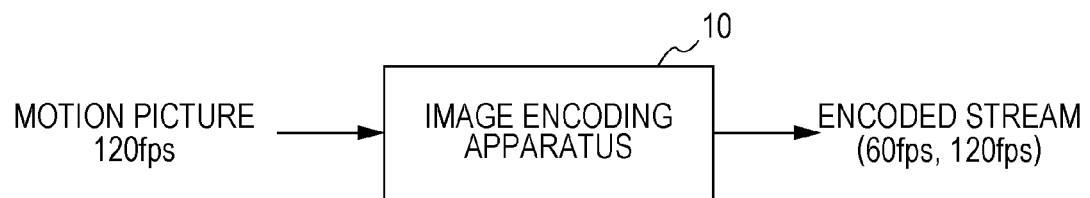
FIG. 3 is a diagram for explaining an image encoding apparatus according to a first exemplary embodiment.

FIG. 3 is a diagram for explaining an image encoding apparatus according to the present exemplary embodiment.

Image encoding apparatus 10 in the present exemplary embodiment obtains a motion picture at a frame rate of 120 fps, and encodes the motion picture, thus generating and outputting an encoded stream. In a case where all the pictures included in this encoded stream are decoded, the motion picture is displayed at a frame rate of 120 fps. In a case where some of the plurality of pictures included in this encoded stream are decoded, the motion picture is displayed at a frame rate of 60 fps. For example, some of the plurality of pictures included in the encoded stream are a plurality of pictures each of which belongs to one of layers other than the highest layer.

Figure 4:
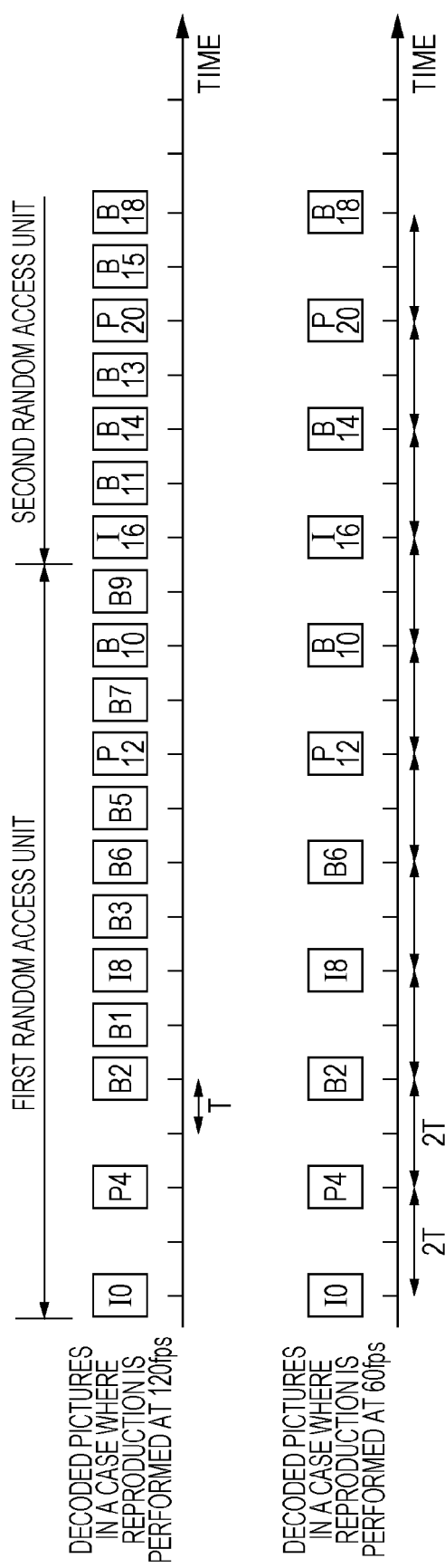
FIG. 4 is a diagram illustrating an example of encoding a motion picture by using three layers according to the first exemplary embodiment.

FIG. 4 is a diagram illustrating an example of encoding a motion picture by using three layers according to the present exemplary embodiment. Image encoding apparatus 10 according to the present exemplary embodiment generates 120 fps encoded stream by encoding a motion picture on the basis of a prediction structure similar to the prediction structure of the picture as illustrated in FIG. 1A. At this occasion, image encoding apparatus 10 adjusts a decoding time (DTS: Decoding Time Stamp) of pictures that are decoded only during reproduction at 120 fps such that the decoding interval at which the encoded stream is reproduced at 60 fps becomes 2T (1/60 seconds). More specifically, image encoding apparatus 10 adjusts the DTS of the plurality of pictures which belong to the highest layer of the plurality of layers.

Figure 5:
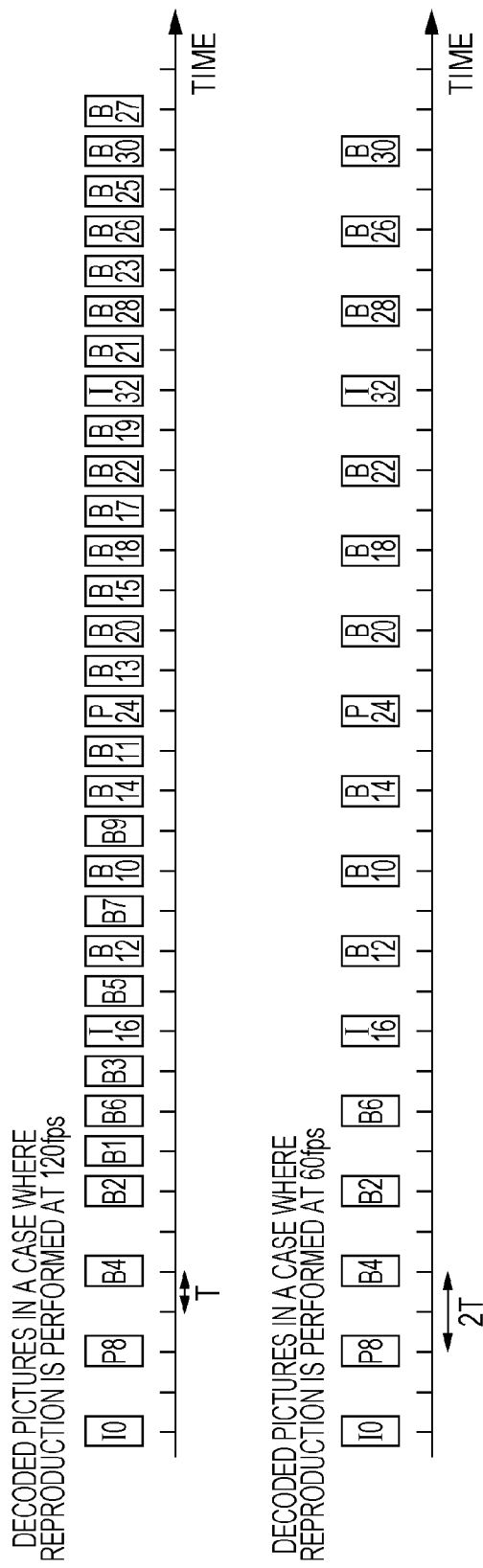
FIG. 5 is a diagram illustrating an example of encoding a motion picture by using four layers according to the first exemplary embodiment.

FIG. 5 is a diagram illustrating an example of encoding a motion picture by using four layers according to the present exemplary embodiment. Image encoding apparatus 10 according to the present exemplary embodiment generates 120 fps encoded stream by encoding a motion picture on the basis of a prediction structure similar to the prediction structure of the picture as illustrated in FIG. 1B. At this occasion, image encoding apparatus 10 adjusts a decoding time of pictures that are decoded only during reproduction at 120 fps such that the decoding interval at which the encoded stream is reproduced at 60 fps becomes 2T (1/60 seconds).

At this occasion, when the motion picture is encoded, a random access unit called GOP (Group Of Pictures) and the like is configured so as to allow decoding to be started from any given picture of the encoded stream. In a random access unit, a leading picture in the decoding order is a random access point. For example, as illustrated in FIG. 4, picture I0 to picture B9 are a first random access unit, and picture I16 is a head picture of a second random access unit. In this case, in the second random access unit, a picture such as picture B11 does not refer to picture I16 or pictures subsequent to picture I16 in the decoding order, but is included in the second random access unit.

In a recording an encoded stream that is broadcast (that is, broadcast stream) and the like, a random access unit such as the first random access unit may be recorded to the end of the random access unit. At this occasion, although picture P12 can be decoded, picture B11 is included in the second random access unit and is therefore unable to be decoded. Therefore, operation during decoding would be complicated.

In this case, a picture that satisfies a predetermined condition will be referred to as an advance picture. The predetermined condition for the picture is: (1) the picture refers to a picture included in a random access unit immediately before the random access unit including the picture in question in the decoding order; and (2) the picture is before, in the display order, any of the pictures included in the random access unit immediately before the random access unit including the picture in question in the decoding order. It should be noted that the random access unit is a unit defined by the encoding order and the decoding order, and the encoding order and the decoding order are the same. Further, a random access unit existing immediately before the random access unit including the advance picture, such as the first random access unit, will be referred to as an open end random access unit. A picture which is included in the open end random access unit and which is after the advance picture in the display order will be referred to as an isolated picture. For example, In FIG. 4, picture B11 is an advance picture, and picture P12 is an isolated picture.

Figure 6:
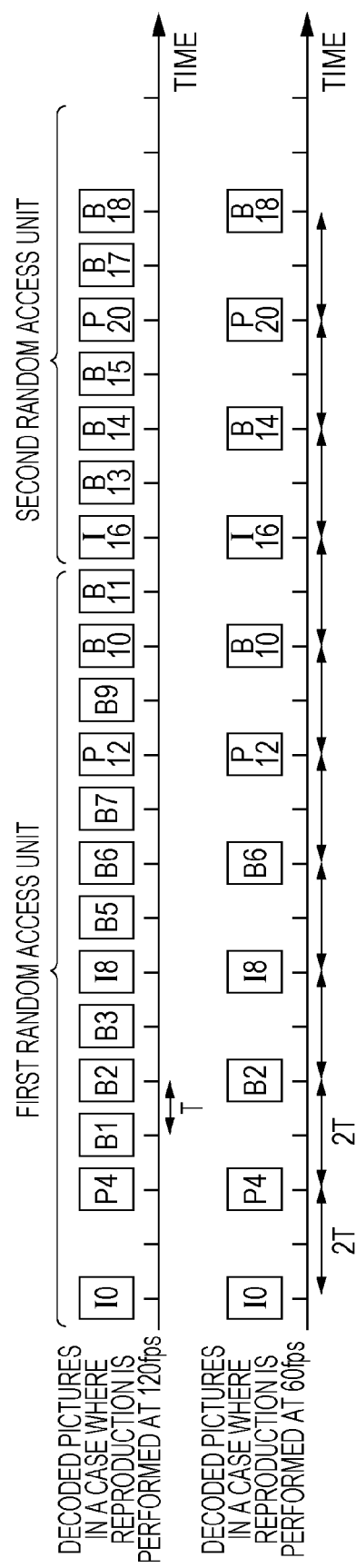
FIG. 6 is a diagram illustrating another example of encoding a motion picture by using three layers according to the first exemplary embodiment.

FIG. 6 is a diagram illustrating another example of encoding a motion picture by using three layers according to the present exemplary embodiment.

Image encoding apparatus 10 according to the present exemplary embodiment may encode an image so as not to generate any open end random access unit as illustrated in FIG. 6 when temporal scalability is realized by using three layers.

In the display order, any of the pictures included in the second random access unit is after picture P12 which is the last of the first random access unit. Therefore, all the pictures included in the second random access unit do not become advance pictures. As a result, the first random access unit does not become an open end random access unit. However, since picture B2 is after picture B1 in the decoding order, picture B1 cannot refer to picture B2. Likewise, since picture B6 is after picture B5 in the decoding order, picture B5 cannot refer to picture B6. As described above, the prediction structure of the pictures each with Temporal ID of 2 is restricted.

In the example of FIGS. 4 to 6, the cases where the number of layers is three and four have been explained using examples of temporal scalability of 60 fps and 120 fps. However, a combination of frame rates, and the number of layers that can be realized are not limited to the above. This can be realized as long as the following condition is guaranteed: where a display interval of pictures for a frame rate of display is denoted as T_pts when only pictures of low layer are decoded and displayed, a decoding interval of given pictures which are continuous in the decoding order is the same as T_pts or equal to or more than T_pts. Image encoding apparatus 10 dynamically encodes images in such a manner as to satisfy this condition.

Figure 7:
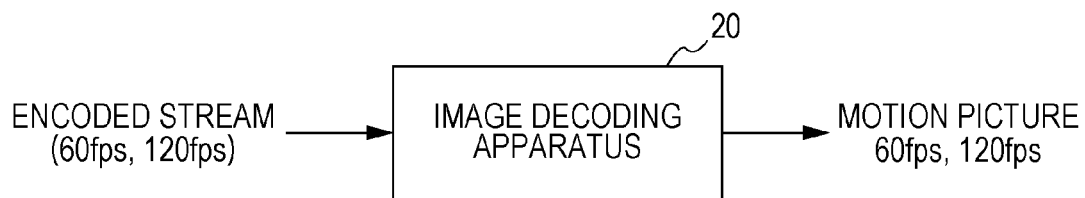
FIG. 7 is a diagram for explaining an image decoding apparatus according to the first exemplary embodiment.

FIG. 7 is a diagram for explaining image decoding apparatus 20 according to the present exemplary embodiment.

Image decoding apparatus 20 according to the present exemplary embodiment obtains an encoded stream generated by image encoding apparatus 10 explained above. Image decoding apparatus 20 displays a motion picture at a frame rate of 120 fps by decoding all the pictures included in this encoded stream. Image decoding apparatus 20 displays a motion picture at a frame rate of 60 fps by decoding some of the plurality of pictures included in this encoded stream. For example, some of the plurality of pictures included in the encoded stream are a plurality of picture each of which belongs to one of layers other than the highest layer.

As described above, in the present exemplary embodiment, the decoding times of the plurality of pictures which do not belong to the highest layer (hereinafter referred to as lower layer pictures) included in the encoded stream are spaced at regular intervals. Therefore, when the image decoding apparatus decodes only the plurality of lower layer pictures in the encoded stream, the image decoding apparatus can decode the lower layer pictures in order at every lapse of regular interval of time. Therefore, by setting the regular interval to an appropriate time (for example, 2T=1/60 seconds as described above), the processing load of the image decoding apparatus can be alleviated. More specifically, the image decoding apparatus can perform decoding at a frame rate according to the processing performance of the image decoding apparatus without performing decoding of each picture at a high frame rate. For example, when an encoded stream of 60 fps is decoded, a time it takes to decode a single picture may be guaranteed to be equal to or less than 1/60 seconds.

First Modification

In this case, a DTS of a leading picture of a random access unit will be explained.

Figure 8:
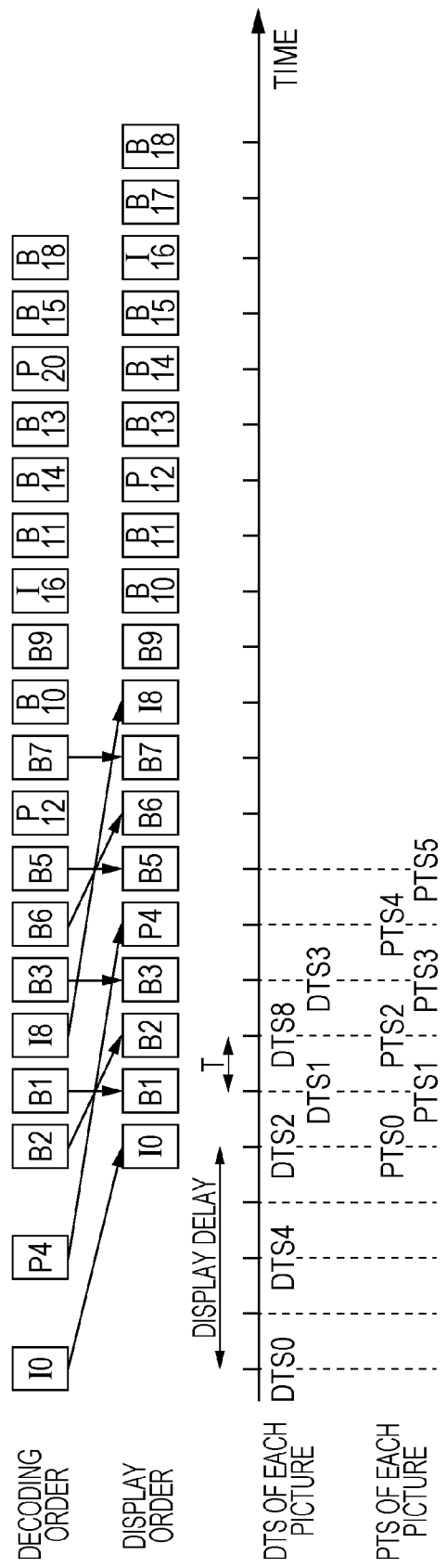
FIG. 8 is a diagram illustrating decoding order and display order of pictures and DTS (Decoding Time Stamp) and PTS (Presentation Time Stamp) of pictures when the encoded stream is reproduced at 120 fps according to the first exemplary embodiment.

FIG. 8 is a diagram illustrating the decoding order and the display order of pictures and DTS and PTS (Presentation Time Stamp: display time) of pictures when the encoded stream as illustrated in FIG. 4 is reproduced at 120 fps.

In this case, a subscript (number) for each of DTS and PTS denotes display order. For example, in MPEG-2 TS (Transport Stream) for broadcasting, DTS or PTS is indicated by a header of a PES packet. In MMT (MPEG Media Transport) or RTP (Real-time Transport Protocol), DTS or PTS is indicated by, for example, a header of a packet in a transport layer or header information of an encoded stream included in a payload. In a format of a type in which a file is transmitted without being converted into packets such as MPEG-DASH (Dynamic Adaptive Streaming over HTTP), DTS or PTS is included in a header portion of a file. Alternatively, in MPEG-4 AVC or HEVC, DTS or PTS can be indicated in an encoded stream by using SEI (Supplemental Enhancement Information) such as Picture Timing SEI or Buffering Period SEI.

In a conventional encoded stream, when the interval of PTS in two pictures displayed at a fixed frame rate and continuous in the display order is denoted as T, the interval of DTS in two pictures continuous in the decoding order is always T. Therefore, when the reproduction apparatus (or image decoding apparatus) starts decoding a leading picture in the decoding order at timing of DTS, the reproduction apparatus (or image decoding apparatus) may decode subsequent pictures in order at every interval of T without referring to DTS of subsequent pictures.

On the other hand, in the encoded stream according to the present exemplary embodiment, as illustrated in FIG. 8, an interval of DTS between picture I0 and picture P4 and an interval of DTS between picture P4 and picture B2 are 2T (T is, for example, 1/120 seconds). An interval of DTS between picture B2 and picture B1 and an interval of DTS between two pictures continuous after picture B1 in the decoding order are T. Therefore, in the encoded stream according to the present exemplary embodiment, the interval of DTS between pictures is variable. Accordingly, the image decoding apparatus (or the reproduction apparatus) needs to refer to DTS for each picture, and decode the picture at the timing of DTS.

Image decoding apparatus 20 according to the present modification decodes and displays pictures on the basis of timing of a video processing signal generated at a regular interval. For example, when the frame rate of the display is 120 fps, image decoding apparatus 20 generates a video processing signal at every T (for example, 1/120 seconds), and decodes and displays a picture at the timing of generation of the video processing signal. In the encoded stream as illustrated in FIG. 8, an interval of DTS between picture I0 and picture P4 and an interval of DTS between picture P4 and picture B2 are twice the cycle T of the video processing signal. Further, an interval of DTS between two pictures continuous after picture B2 in the decoding order is the same as the cycle T of the video processing signal.

Figure 9:
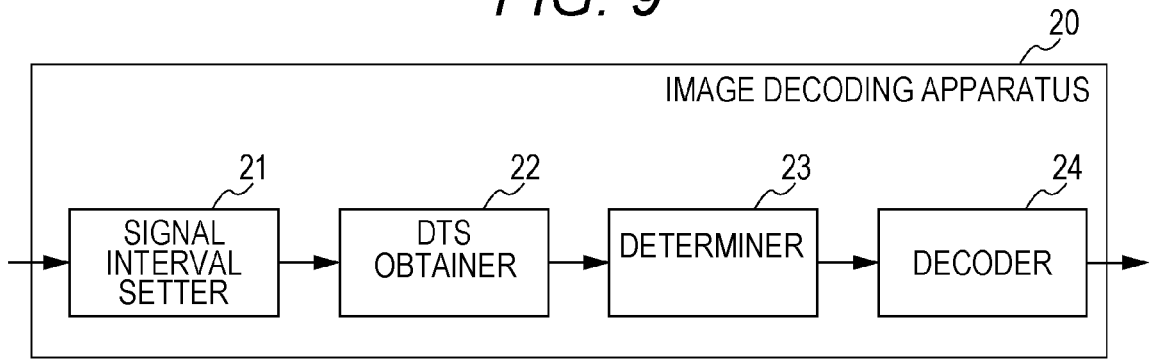
FIG. 9 is a block diagram illustrating a configuration of an image decoding apparatus according to a first modification of the first exemplary embodiment.

FIG. 9 is a block diagram illustrating a configuration of image decoding apparatus 20 according to the present modification.

Image decoding apparatus 20 according to the present modification has the same function as image decoding apparatus 20 according to the exemplary embodiment, and decodes an encoded picture at timing indicated by DTS of the picture. Image decoding apparatus 20 as described above includes signal interval setter 21, DTS obtainer 22, determiner 23, and decoder 24.

Figure 10:
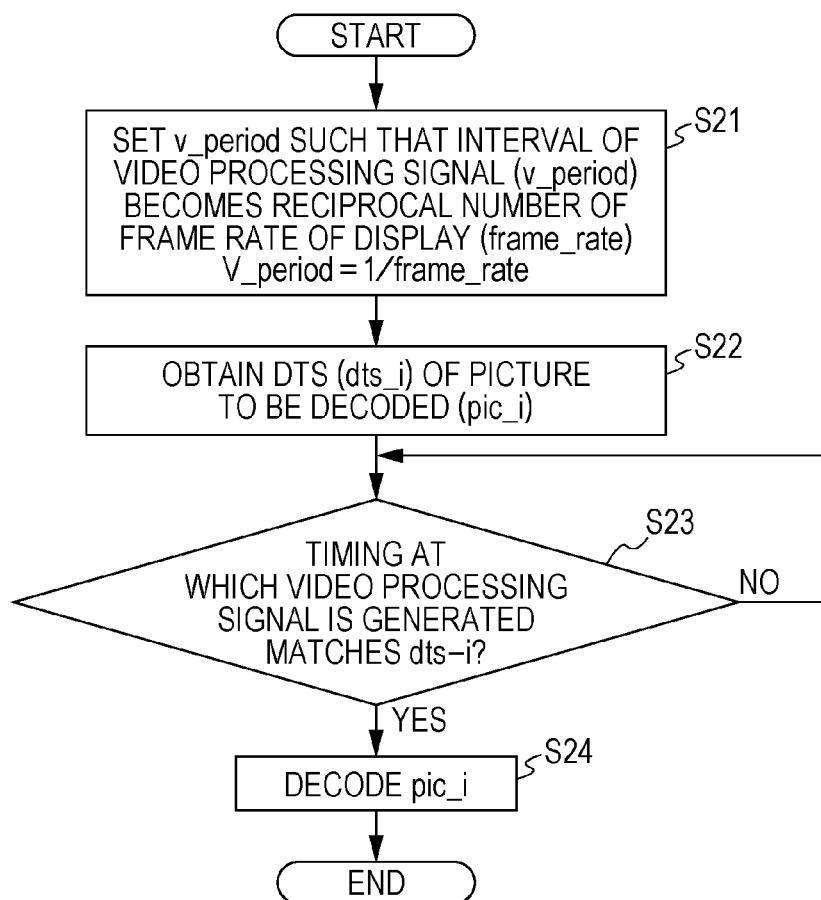
FIG. 10 is a flowchart illustrating an example of operation in which the image decoding apparatus according to the first modification of the first exemplary embodiment decodes pictures in all the layers.

FIG. 10 is a flowchart illustrating an example of operation in which image decoding apparatus 20 according to the present modification decodes pictures in all layers.

First, signal interval setter 21 of image decoding apparatus 20 sets an interval or a cycle for generating a video processing signal (hereinafter referred to as V_period) such that V_period becomes a reciprocal of a frame rate for decoding and displaying all layers (step S21).

Subsequently, DTS obtainer 22 obtains DTS of a picture to be decoded (hereinafter referred to as dts_i) from a header of a PES packet and the like which stores encoded data of the picture (step S22). Subsequently, determining unit 23 monitors timing at which the video processing signal is generated, and determines whether the timing matches dts_i (step S23). When the interval of DTS of the picture is N times as large as V_period, timing at which a video processing signal is generated in the N times counted from the decoding time of the picture that is decoded immediately before matches dts_i. When the timing is determined to match dts_i ("YES" in step S23), decoder 24 decodes the picture to be decoded (step S24). On the other hand, when the timing is determined not to match dts_i ("NO" in step S23), determining unit 23 repeatedly executes the processing in step S23.

It should be noted that step S21 may be carried out once before the decoding of the head picture is started, and it is not necessary to perform step S21 for every decoding of a picture. In the determination in step S23, when a difference value between the timing at which the video processing signal is generated and dts_i is less than a predetermined threshold value, both may be determined to match each other. The operation as illustrated in FIG. 10 can be applied to not only the temporal scalability between the decoding of all the layers and the decoding of low layers but also temporal scalability between two different low layers.

As described above, in image decoding apparatus 20 according to the present modification, in a case where the interval of DTS can be expressed as an integral multiple of a cycle of the video processing signal even if the interval of DTS is variable, the picture can be decoded in accordance with variable DTS. As a result, the amount of processing for determining the timing of decoding can be reduced.

In this case, the following case will be considered: a frame rate where all the layers are decoded (hereinafter referred to as FrameRateAll) is not an integral multiple of a frame rate where only low layers are decoded (hereinafter referred to as FrameRatePart) like temporal scalability of 50 fps and 120 fps. At this occasion, in order to guarantee decoding with the image decoding apparatus having a decoding performance of 50 fps, the interval of DTS in a case of decoding only low layers needs to be 1/50 seconds. However, since FrameRateAll is not an integral multiple of FrameRatePart, the decoding intervals of pictures during reproduction at 120 fps are not constant (that is, a fixed interval), and in addition, the interval of DTS (1/50 seconds) does not become an integral multiple of the cycle of the video processing signal (1/120 seconds). As a result, decoding cannot be performed at a time indicated by DTS, and an overflow or an underflow may occur in, for example, a buffer of an encoded picture. Therefore, when image encoding apparatus 10 according to the present modification provides temporal scalability, image encoding apparatus 10 according to the present modification may determine a combination of layers for realizing the temporal scalability such that the frame rate of display in a case where all the layers are decoded becomes an integral multiple of a frame rate of display in a case where only low layers are decoded. Alternatively, image encoding apparatus 10 may store, in an encoded stream, information indicating that the frame rate in the case where all the layers are decoded becomes an integral multiple of the frame rate in a case where only some of the layers are decoded. Still alternatively, image encoding apparatus 10 may store the information in a descriptor in a TS (TransportStream) constituted by multiplexing the encoded stream.

In a random access unit, a difference between DTS of the leading picture in the decoding order and PTS of the leading picture in the display order will be referred to as a display delay. In the example as illustrated in FIG. 8, a difference between DTS0 and PTS0 is a display delay. In a conventional encoded stream in which the frame rate of the display is fixed, the interval of DTS is fixed and is the same as the interval of PTS. Therefore, the display delay is expressed by a value obtained by multiplying a number of pictures decoded until the PTS of the leading picture in the display order by the interval of PTS. In the example as illustrated in FIG. 8, there are two pictures, that is, picture I0 and picture P4, which are decoded until the PTS of picture I0, and accordingly, in a conventional calculation method, the display delay is calculated as 2×T. However, in the example as illustrated in FIG. 8, the interval of PTS between picture I0 and picture P4 and the interval of PTS between picture P4 and picture B2 are twice that of T. Therefore, the actual display delay is 4×T. Thus, in a conventional method, the display delay cannot be expressed appropriately.

Therefore, image encoding apparatus 10 according to the present modification may incorporate, into an encoded stream, information indicating that how many times the display delay becomes as that of the interval of PTS in order to correctly express the display delay even in an encoded stream in which the interval of DTS is not constant. In the example as illustrated in FIG. 8, the interval of PTS is T, and the display delay is four times of T, and therefore, image encoding apparatus 10 expresses the display delay as four. Alternatively, image encoding apparatus 10 may indicate the display delay as an actual time length such as "4×T". In a case where a number of pictures decoded until the PTS of the leading picture in the display order is necessary, image encoding apparatus 10 may indicate the number of pictures separately from the information indicating the display delay. Image encoding apparatus 10 may seamlessly connect a plurality of streams, or a plurality of particular sections of the stream, or the like. At this occasion, image encoding apparatus 10 encodes the streams or the particular sections such that the display delays become equal by considering that the interval of DTS is variable in the streams or the particular sections before and after the connection. At this occasion, image encoding apparatus 10 may store, in an encoded stream, information indicating that the display delays are equal before and after the seamless connection. When image encoding apparatus 10 encodes streams seamlessly connected with each other, image encoding apparatus 10 may not encode the streams such that the number of pictures decoded until the PTS of the leading picture in the display order before the seamless connection is equal to the number of pictures decoded until the PTS of the leading picture in the display order after the seamless connection, and instead, image encoding apparatus 10 may encode streams such that the display delays defined by the present modification are the same.

In a case where the frame rate of the display is constant, that is, the interval of PTS is constant, image encoding apparatus 10 according to the present modification may signal auxiliary information indicating that the interval of DTS is not constant. For example, the auxiliary information is a flag indicating whether the interval of DTS is constant or not. In this case, in a case where a flag indicating that the interval of DTS is not constant is set, image decoding apparatus 20 performs operation as illustrated in FIG. 10, and in a case where a flag indicating that the interval of DTS is not constant is not set, the interval of DTS is constant, and therefore, image decoding apparatus 20 may operate without referring to DTS for every picture.

Image encoding apparatus 10 according to the present modification may set the auxiliary information may set the auxiliary information for each random access unit, or may set the auxiliary information for each encoded stream unit or a unit referred to by a play list in accumulated content. The auxiliary information may be stored in any of an area for storing private data in TS packet (such as private_data_bytes), management information about the contents of accumulated content, or a plurality of layers of a transmission and reception system of content such as SEI of an encoded stream such as MPEG-4 AVC or HEVC. However, since it is preferable that the auxiliary information can be referred to before the encoded stream is decoded, image encoding apparatus 10 may store the auxiliary information in a higher layer of a transmission and reception system of content such as a multiplex layer, such as TS or management information about multiplexed data. As described above, in the present modification, non-regular interval information indicating that the decoding times determined for the plurality of pictures included in a motion picture are not spaced at regular intervals is included, as the auxiliary information, in the encoded stream.

When image encoding apparatus 10 according to the present modification decodes only the low layers of an encoded stream having temporal scalability, image encoding apparatus 10 according to the present modification may store, in the encoded stream, information indicating that the interval of DTS of any given two pictures continuous in the decoding order is variable. When the frame rate of the display in the case where only the low layers are decoded (hereinafter referred to as frame_rate) is considered to be constant, this information indicates that the interval of DTS of any given two pictures continuous in the decoding order is the same as 1/frame_rate (seconds) or equal to or more than 1/frame_rate (seconds). For example, in MPEG2-TS, identification information about an encoded stream constituting a program is shown in PMT (Program Map Tables). Image encoding apparatus 10 according to the present modification may show the information by defining a descriptor in PMT. For example, in a case where a descriptor in PMT indicates that the interval of DTS is less than 1/60 seconds, image decoding apparatus 20 having a decoding performance up to 60 fps does not perform decoding or reproduction of the encoded stream. Alternatively, image decoding apparatus 20 may perform operation of setting DTS again such that the decoding interval of each picture is equal to or more than 1/60 seconds, and decoding each picture. In a case where the operation of setting DTS again involves changing PTS, image decoding apparatus 20 also changes PTS.

Second Modification

Subsequently, a change of a decoding time of a picture will be explained.

When image decoding apparatus 20 according to the exemplary embodiment decodes all the layers, image decoding apparatus 20 may change DTS of a picture before the start of decoding such that the interval of DTS becomes 1/frame_rate (seconds).

Figure 11:
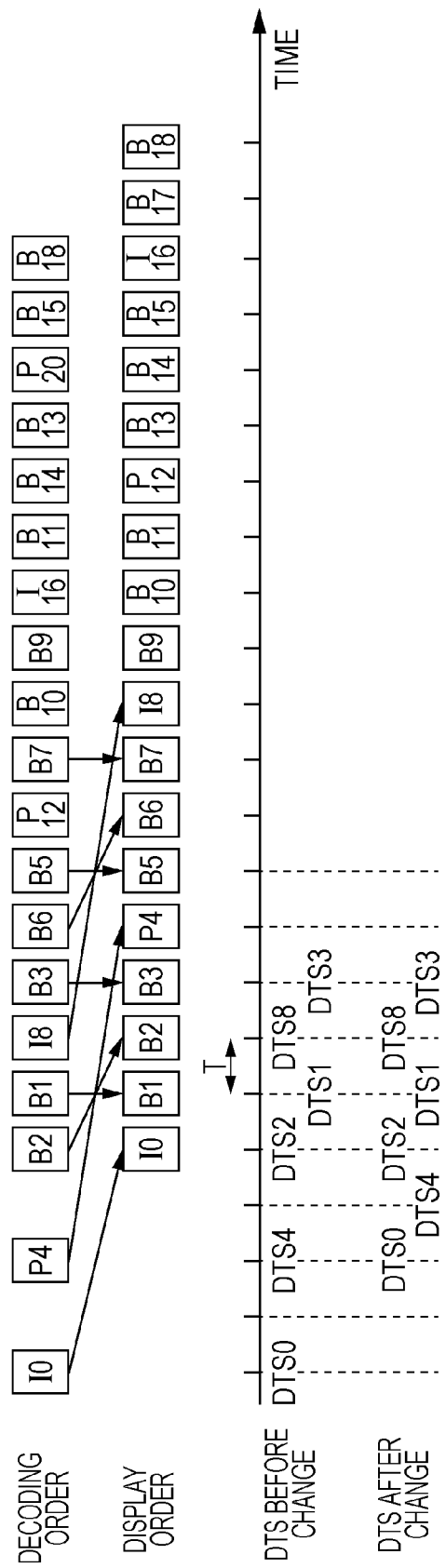
FIG. 11 is a diagram illustrating an example of changing DTS according to a second modification of the first exemplary embodiment.

FIG. 11 is a diagram illustrating an example of changing DTS.

As illustrated in FIG. 11, image decoding apparatus 20 according to the present modification changes the DTSs of picture I0 and picture P4 so that all the intervals of DTSs are set to 1/frame_rate (seconds). A picture of which interval of DTS is variable is a picture that is decoded before the PTS of the leading picture in the display order. By changing the DTSs of these pictures, the interval of DTS can be guaranteed to be fixed. When the interval of DTS is fixed, the timing of decoding of a picture can be determined and decoding can be performed according to the same method as the conventional method. It should be noted that only the DTS of a picture that is decoded before the PTS of the leading picture in the display order is changed to be delayed, and the changed interval of DTS is 1/frame_rate (seconds). Therefore, any particular problem would not occur in a decoder model such as HRD (Hypothetical Reference Decoder) in MPEG-4 AVC or HEVC.

When image encoding apparatus 10 according to the present modification multiplexes encoded streams with TS, image encoding apparatus 10 according to the present modification may indicate a changed value of DTS in TREF (Timestamp Reference) field and the like in PES header. In a case where another multiplex method is used, image encoding apparatus 10 may also indicate DTSs before the change and after the change. Further, information indicating a corresponding relationship between a layer to be decoded and used DTS or PTS, for example, an indication of use of changed DTS in a case where all the layers are decoded, may be indicated in, for example, a descriptor in a TS, program information in a transport layer, or management information in accumulated content. Image encoding apparatus 10 may indicate information indicating that the changed interval of DTS is fixed or the interval is equal to the interval of PTS, in program information in a transport layer or management information in accumulated content.

By doing so, even if the processing performance is low, image decoding apparatus 20 can decode only the low layer. Image decoding apparatus 20 having high processing performance for decoding all the layers analyzes a descriptor of MPEG-2 TS and the like or determines whether there exists a TREF field of a PES packet header, so that Image decoding apparatus 20 can find that the changed DTS or PTS is transmitted. Therefore, image decoding apparatus 20 can decode the encoded stream by using the changed DTS or PTS.

In a case where image decoding apparatus 20 records an encoded stream based on the assumption that all the layers can be decoded, the encoded stream in which the DTS has been changed as described above may be recorded. At this occasion, instead of using a filed for storing a changed DTS or PTS such as TREF, a field of DTS or PTS of the PES header may be changed.

Third Modification

Subsequently, auxiliary information for playback control will be explained.

Figure 12:
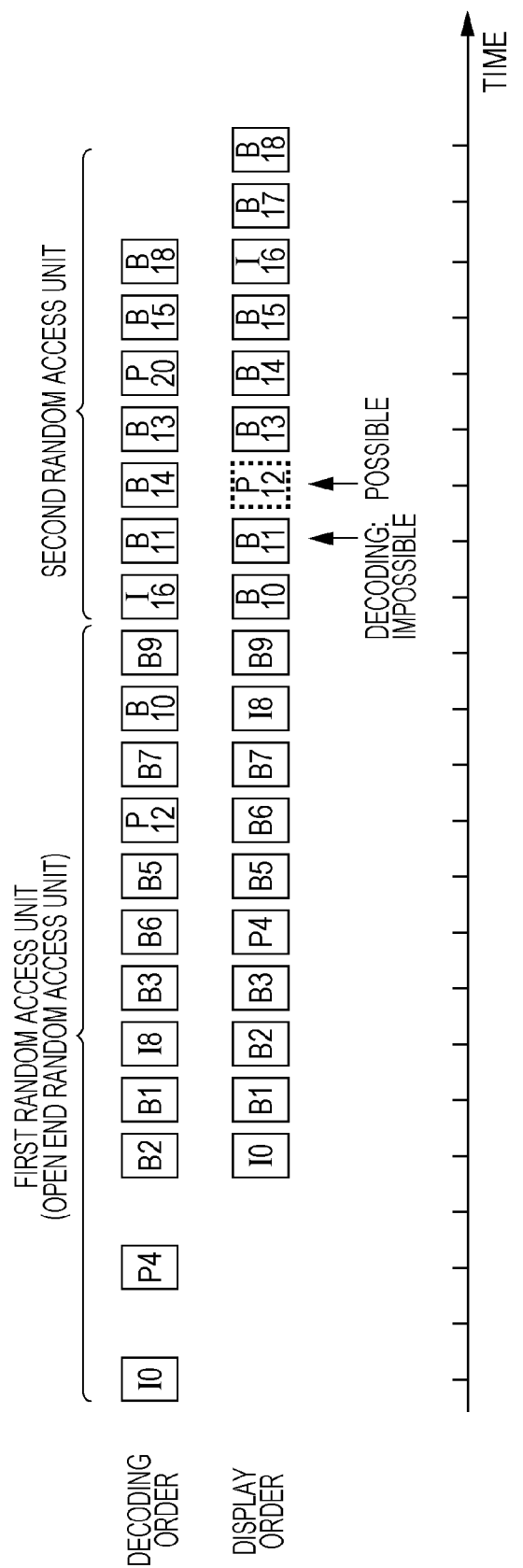
FIG. 12 is a diagram for explaining pictures decoded in an open end random access unit according to a third modification of the first exemplary embodiment.

FIG. 12 is a diagram for explaining pictures decoded in an open end random access unit.

For example, in the example as illustrated in FIG. 12, an end of an accumulated encoded stream or an encoded stream obtained via a communication network matches an end of a first random access unit which is an open end random access unit. At this occasion, pictures B11, B13, B14, B15 included in a second random access unit cannot be decoded. However, picture P12 which belongs to the first random access unit can be decoded. In this case, picture B11 is an advance picture, and picture P12 is an isolated picture.

It should be noted that in a random access unit in an encoded stream, all the pictures constituting the random access unit except a predetermined picture can be decoded without referring to other random access units. In a case where a random access unit is configured as an open GOP (Group Of Pictures), a predetermined picture is a picture that is before, in the display order, the leading picture in the decoding order, in the random access unit. Such a predetermined picture may refer to a picture included in the random access unit immediately before the random access unit of the predetermined picture in the decoding order. Therefore, in a case where decoding is started from the head of the random access unit which is an open GOP, the predetermined picture cannot be decoded. Therefore, the image decoding apparatus decodes and displays, as a picture that can be decoded, each of all the pictures in the random access unit that are after, in display order, the leading picture in the decoding order.

In this case, image decoding apparatus 20 that has obtained encoded data up to the open end random access unit in the encoded stream has not obtained an advance picture, and therefore, image decoding apparatus 20 cannot decode the advance picture. For this reason, image encoding apparatus 10 according to the present modification incorporated, into the encoded stream, auxiliary information for reproduction control.

The auxiliary information for reproduction control is, for example, information as shown in (1) to (5) below: (1) information indicating whether or not the random access unit is an open end random access unit; (2) information indicating whether or not the random access unit is a last random access unit in a section continuously placed back, such as the end of the encoded stream or the last random access unit indicated by a play list and the like; (3) information indicating whether or not the picture is an isolated picture, or information indicating whether or not the picture is a last isolated picture in the display order in the random access unit; (4) information indicating whether or not the picture is an advance picture; and (5) information indicating whether or not there is an isolated picture that is after, in display order, a designated picture in the random access unit. It should be noted that, in the (2), in a case where discontinuous sections in an encoded stream, encoded streams different from each other, and the like are coupled, a random access unit before the coupled portion cannot refer to a picture in a subsequent random access unit. Therefore, the random access unit before the coupled portion is also treated in the same manner as the last random access unit in the reproduction section.

Image encoding apparatus 10 according to the present modification may set the auxiliary information for reproduction control for each random access unit, for each encoded stream unit, or for each unit referred to by a play list in accumulated content. The auxiliary information can be stored in any of an area for storing private data in TS packet (such as private_data_bytes), management information about the contents of accumulated content, or a plurality of layers of a transmission and reception system of content such as SEI of an encoded stream such as MPEG-4 AVC or HEVC. However, since it is preferable that the auxiliary information can be referred to before the encoded stream is decoded, image encoding apparatus 10 may store the auxiliary information in a higher layer of a transmission and reception system of content such as a multiplex layer such as TS or management information about multiplexed data.

The above (1) and (2) information is attribute information indicating an attribute of a random access unit. Image encoding apparatus 10 stores the attribute information in, for example, an SEI that is before, in decoding order, the head picture of the random access unit, or a packet header or a payload in a transport layer such as a TS packet or an MMT packet for storing the head picture of the random access unit, or a table for managing an attribute of a random access unit in management information about content. In a case where, in a transport layer, for example, information for indicating a random access point is signaled such as random_access_indicator of a TS packet, the attribute information may be stored in the packet indicating the random access point.

The above (3) and (4) information is attribute information about each picture constituting the random access unit. Image encoding apparatus 10 may collectively store the attribute information in the random access unit, or may store the attribute information for each picture. In a case where the attribute information is stored for each picture, image encoding apparatus 10 attaches an SEI to each random access unit in an encoded stream, or stores the attribute information in a header or a payload of a TS packet storing head data of a picture. Image encoding apparatus 10 may store attribute information about a picture only in a case where the random access unit is an open end random access unit.

Subsequently, an image decoding method of an open end random access unit will be explained.

Figure 13:
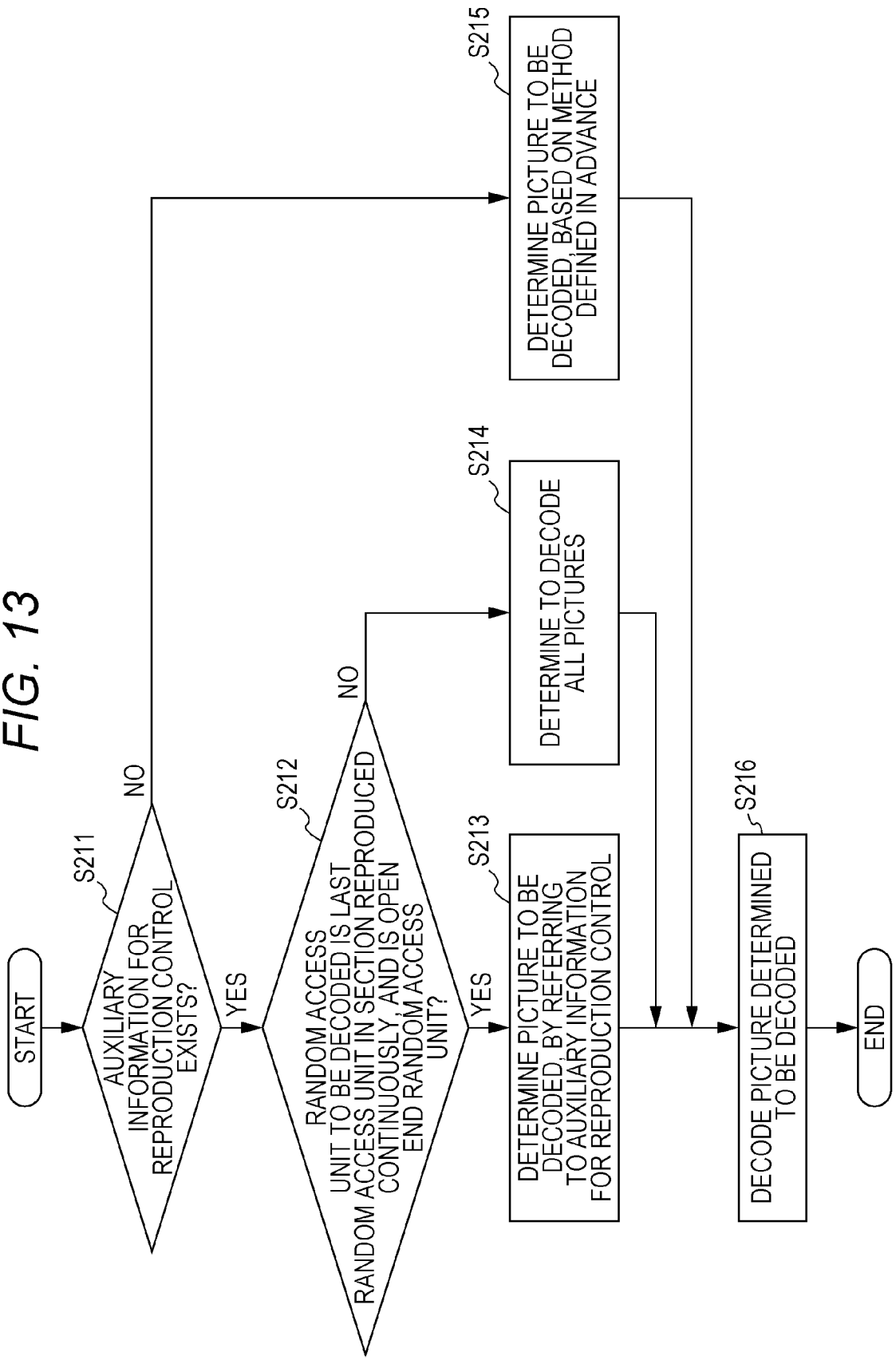
FIG. 13 is a flowchart illustrating an example of operation in which an image decoding apparatus according to the third modification of the first exemplary embodiment decodes a motion picture on the basis of auxiliary information for reproduction control.

FIG. 13 is a flowchart illustrating an example of operation in which image decoding apparatus 20 according to the present modification decodes a motion picture on the basis of auxiliary information for reproduction control.

First, image decoding apparatus 20 determines whether or not there exists auxiliary information for reproduction control in management information about content, a transport layer such as a TS, or an encoded stream (step S211). In a reproduction section reproduced continuously, auxiliary information for reproduction control is either provided or not provided in all the random access units constituting the reproduction section. Therefore, the processing of step S211 is performed only on the random access unit at the head in the reproduction section.

In this case, in a case where it is determined that there exists auxiliary information for reproduction control ("YES" in step S211), image decoding apparatus 20 performs the processing of step S212, and in a case where it is determined that there does not exist auxiliary information for reproduction control ("NO" in step S211), image decoding apparatus 20 performs the processing of step S215.

In step S215, image decoding apparatus 20 determines a picture to be decoded, on the basis of a method defined in advance (step S215). In step S212, image decoding apparatus 20 determines whether or not the following condition is satisfied: the random access unit to be decoded is the last random access unit in the section reproduced continuously, and is an open end random access unit (step S212).

In this case, in a case where the condition is determined to be satisfied ("YES" in step S212), image decoding apparatus 20 determines a picture to be decoded, by referring to the auxiliary information for reproduction control (step S213). On the other hand, in a case where the condition is determined not to be satisfied ("NO" in step S212), image decoding apparatus 20 determines to decode all the pictures included in the random access unit (step S214). However, at this occasion, in a case where the random access unit to be decoded is a random access unit at the head in the reproduction section, image decoding apparatus 20 does not decode a picture that refers to a picture included in a random access unit immediately before the random access unit to be decoded in the decoding order.

Then, image decoding apparatus 20 decodes a picture determined in processing in any one of steps S213, S214, and S215 (step S216).

It should be noted that the processing of step S212 may be performed for each random access unit. In a case where the auxiliary information of each of the plurality of pictures is collectively stored in the random access unit, the determination of the picture in step S213 is performed at the start of decoding of the random access unit. In a case where the auxiliary information of each of the plurality of pictures is stored for each picture, the determination of the picture is performed for each picture.

It should be noted that in a case where the auxiliary information for reproduction control does not indicate the information of the picture for each picture, image decoding apparatus 20 may determine whether or not there exists a picture referred to in step S213. Accordingly, image decoding apparatus 20 determines whether or not a picture can be decoded and can determine the picture to be decoded.

It should be noted that image decoding apparatus 20 may perform the determination of the picture in step S213 as follows.

For example, image decoding apparatus 20 determines only a picture that is before the advance picture in display order to be a picture to be decoded, and determines an isolated picture to be a picture that is not decoded.

Alternatively, image decoding apparatus 20 determines a picture that is before the advance picture in display order and an isolated picture to be pictures that are to be decoded. An advance picture that is before the isolated picture in display order cannot be decoded. Therefore, at timing indicated by the PTS of the advance picture, image decoding apparatus 20 freezes and displays a decoded result of a picture that can be decoded and that is immediately before the advance picture in the display order. More specifically, image decoding apparatus 20 also continuously displays a decoded result of a picture immediately before the advance picture at the timing indicated by the PTS of the advance picture. Alternatively, image decoding apparatus 20 may display a decoded result of a picture that can be decoded and that is immediately before the advance picture in the display order and an image obtained by interpolating the decoded result of the advance picture.

In this case, image decoding apparatus having decoding performance of 120 fps decodes only pictures which belong to a layer with Temporal ID of 0 at a decoding interval of 120 fps, thus performing special reproduction such as performing reproduction with four times speed. Therefore, a method for determining a picture to be decoded may be switched between a normal reproduction, in which pictures in all the layers are decoded and displayed, and a special reproduction. For example, in the example as illustrated in FIG. 1A or FIG. 1B, the pictures each with Temporal ID of 0 are only an I picture and a P picture, and the advance picture is not included in these pictures. Therefore, image decoding apparatus 20 may not decode the isolated picture during the normal reproduction, and in a case where only the pictures which belong to the layer with Temporal ID of 0 are decoded and reproduced during the special reproduction, image decoding apparatus 20 may decode the isolated picture. More generally, in a case of special reproduction, image decoding apparatus 20 may decode only a picture which is in a layer to be decoded and which is before the advance picture in display order.

In a case where the random access unit is an open end random access unit, image encoding apparatus 10 may store, in an encoded stream, information for identifying the advance picture or a last isolated picture in the display order as the attribute information of the random access unit. For example, when the decoding order of the advance picture is considered to be the N-th in the random access unit, image decoding apparatus 20 determines to decode only a picture having a PTS before the PTS of the N-th picture. Alternatively, when the last isolated picture in the display order is the N-th in the decoding order, image decoding apparatus 20 determines to decode a picture that is after the isolated picture in display order.

Fourth Modification

For example, in a case where image decoding apparatus 20 according to the present modification in which 60 fps is the upper limit of the decoding performance obtains an encoded stream at frame rate more than 60 fps, image decoding apparatus 20 according to the present modification may convert DTS or PTS of each picture included in the encoded stream such that the picture can be decoded. For example, in a case where image decoding apparatus 20 obtains and records an encoded stream via a broadcast or communication network, image decoding apparatus 20 may convert DTS or PTS. Alternatively, when image decoding apparatus 20 transmits an encoded stream recorded on a memory, a hard disk, and the like to an external device by using a communication network or the like, image decoding apparatus 20 may convert DTS or PTS.

Figure 14:
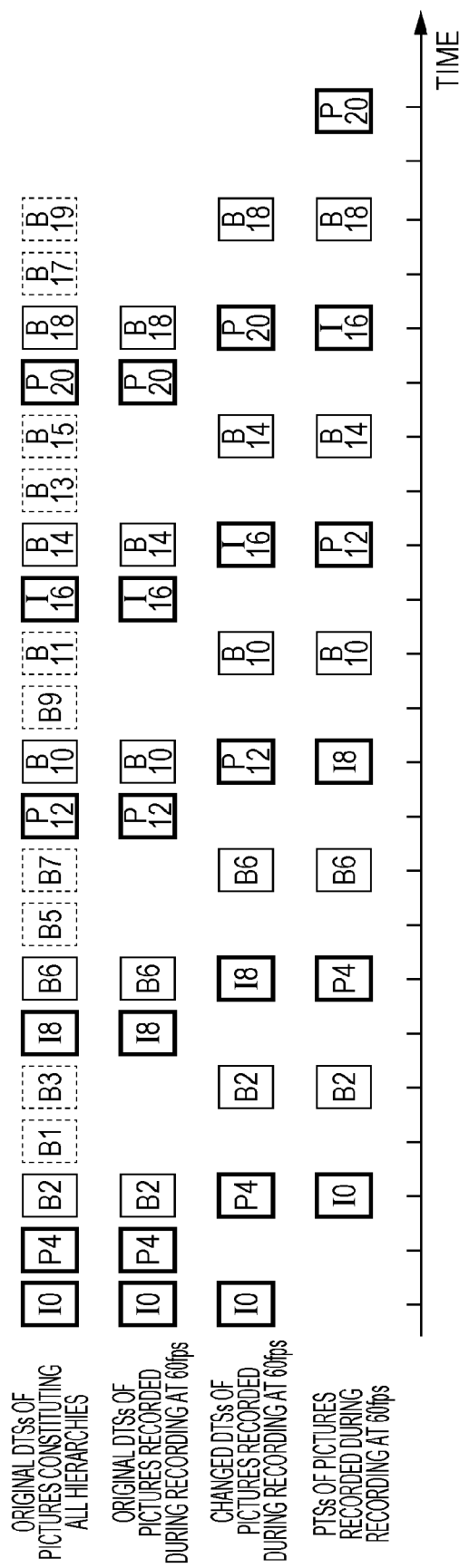
FIG. 14 is a diagram illustrating an example of a conversion of DTS or PTS according to a fourth modification of the first exemplary embodiment.

FIG. 14 is a diagram illustrating an example of a conversion of DTS or PTS. A first line from the top in FIG. 14 indicates original DTSs of all the pictures constituting all the layers included in an original encoded stream. When all the pictures are decoded and displayed, a motion picture is displayed at a frame rate of 120 fps. A second line from the top in FIG. 14 indicates each of recorded pictures and original DTSs of these pictures when the original encoded stream is recorded as an encoded stream of 60 fps. In an encoded stream of 60 fps recorded in this manner, the interval of DTS between pictures is not guaranteed to be ⅟60 (seconds).

A third line from the top in FIG. 14 indicates each of recorded pictures and changed DTSs of these pictures when the original encoded stream is recorded as an encoded stream of 60 fps. Image decoding apparatus 20 according to the present modification performs changes of DTSs as indicated in this third line. As a result of the changes of the DTSs, the interval of DTS between pictures is guaranteed to be ⅟60 (seconds). A fourth line from the top in FIG. 14 indicates each of recorded pictures and original PTSs of these pictures when the original encoded stream is recorded as an encoded stream of 60 fps. It is not necessary to change the PTS, and the same value as the original PTS can be used. In this case, the DTS is changed to be delayed from the original DTS, and the PTS is not changed. Therefore, neither overflow nor underflow occurs in a buffer in a previous stage provided in image decoding apparatus 20 (corresponding to Coded Picture Buffer of MPEG-4 AVC or HEVC), or a buffer for holding a reference picture (corresponding to Decoded Picture Buffer of MPEG-4 AVC or HEVC).

It should be noted that in a case where it is necessary to change PTS, the PTS may be changed so as to satisfy the buffer model (corresponding to Hypothetical Reference Decoder of MPEG-4 AVC or HEVC). When the encoded stream is multiplexed by MPEG-2 TS, the PTS or DTS is indicated in a header of a PES packet. Therefore, image decoding apparatus 20 may change the PTS or DTS in the header of the PES packet. Alternatively, image decoding apparatus 20 may not change the value of the PTS or DTS, and may store the changed value in a TREF (Timestamp Reference) field of a PES packet header. Alternatively, image decoding apparatus 20 may change the PTS or DTS, and then, image decoding apparatus 20 may store the value of the original PTS or DTS in a TREF field.

In the exemplary embodiment and the modification thereof, the description has been given of, as an example, temporal scalable based on a combination of 60 fps and 120 fps, but the present disclosure may be applied to temporal scalable of a combination of other frame rates. In the exemplary embodiment and the modification thereof, as a layer decoded so as to realize temporal scalable, a combination of all the layers and layers other than the highest layer has been explained as an example, but the exemplary embodiment and the modification thereof can also be applied to layers of other combinations.

Hereinabove, the image encoding apparatuses and the image decoding apparatuses according to one or a plurality of aspects have been explained on the basis of the exemplary embodiment and the modification thereof, but the present disclosure is not limited to this exemplary embodiment and the modification thereof.

Figure 15A:
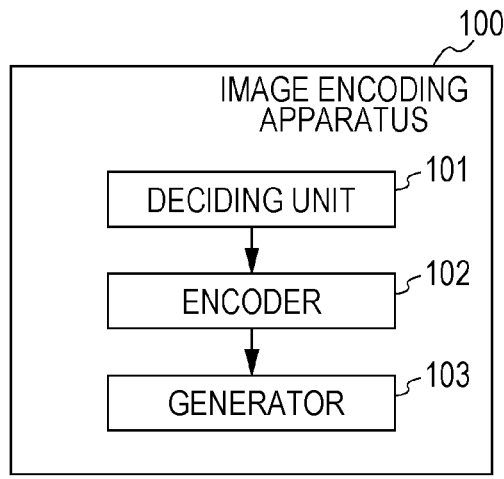
FIG. 15A is a block diagram illustrating an image encoding apparatus according to an aspect of the present disclosure.

FIG. 15A is a block diagram illustrating an image encoding apparatus according to an aspect of the present disclosure.

Image encoding apparatus 100 according to an aspect of the present disclosure is an apparatus for encoding a motion picture for each picture which belongs to any one of a plurality of layers, without referring to another picture which belongs to a layer higher than the layer to which the picture in question belongs, and includes deciding unit 101, encoder 102, and generator 103.

Deciding unit 101 determines decoding times of a plurality of pictures included in the motion picture such that decoding times of a plurality of lower layer pictures which are some pictures of the plurality of pictures included in the motion picture and which do not belong to a highest layer of the plurality of layers are not spaced at regular intervals. At this occasion, further, deciding unit 101 determines decoding times of a plurality of pictures included in the motion picture such that timing for decoding each of the plurality of lower layer pictures is caused to be the same between a case where the plurality of encoded pictures included in the motion picture are decoded and a case where only the plurality of lower layer pictures of the plurality of pictures are decoded Encoder 102 encodes each of the plurality of pictures included in the motion picture in accordance with encoding order according to the decoding times thus determined. Generator 103 generates an encoded stream including the plurality of encoded pictures and decoding times that are determined for the plurality of pictures.

Figure 15B:
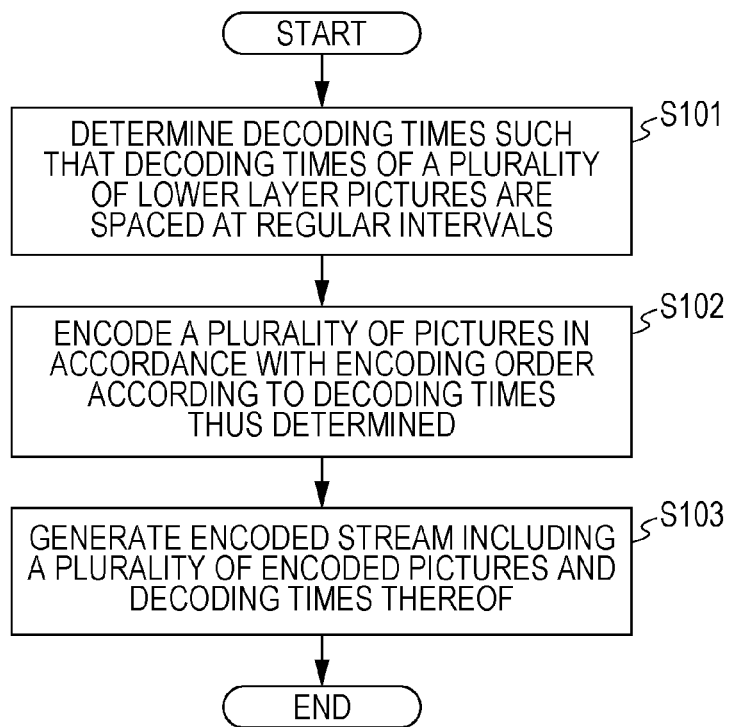
FIG. 15B is a flowchart illustrating an image encoding method according to an aspect of the present disclosure.

FIG. 15B is a flowchart illustrating an image encoding method according to one aspect of the present disclosure.

The image encoding method according to one aspect of the present disclosure is a method in which image encoding apparatus 100 encodes a motion picture for each picture which belongs to any one of a plurality of layers, without referring to another picture which belongs to a layer higher than the layer to which the picture in question belongs. This image encoding method includes step S101, step S102, and step S103. In step S101, decoding times of a plurality of pictures included in the motion picture are determined such that decoding times of a plurality of lower layer pictures which are some pictures of the plurality of pictures included in the motion picture and which do not belong to a highest layer of the plurality of layers are spaced at regular intervals. At this occasion, further, decoding times of a plurality of pictures included in the motion picture are determined such that timing for decoding each of the plurality of lower layer pictures is caused to be the same between a case where the plurality of encoded pictures included in the motion picture are decoded and a case where only the plurality of lower layer pictures of the plurality of pictures are decoded In step S102, each of the plurality of pictures included in the motion picture is encoded in accordance with encoding order according to the decoding times thus determined. In step S103, an encoded stream is generated that includes the plurality of encoded pictures and decoding times that are determined for the plurality of pictures Therefore, each of the plurality of pictures included in the encoded stream is encoded without referring to another picture which belongs to a layer higher than the layer to which the picture in question belongs. Therefore, the image decoding apparatus can decode only the plurality of lower layer pictures in the encoded stream. The decoding times of the plurality of lower layer pictures included in the encoded stream are spaced at the regular intervals. Therefore, when the image decoding apparatus decodes only the plurality of lower layer pictures in the encoded stream, the image decoding apparatus can decode these lower layer pictures in order at every lapse of regular interval of time. Therefore, by setting the regular interval to an appropriate time such as ⅟60 seconds, the processing load of the image decoding apparatus can be alleviated. More specifically, the image decoding apparatus can perform decoding at a frame rate such as 60 fps according to the processing performance of the image decoding apparatus without performing decoding of each picture at a high frame rate such as 120 fps. Further, timing for decoding each of the plurality of lower layer pictures is the same between the case where the plurality of pictures included in the encoded stream (for example, all the pictures) are decoded and the case where only the plurality of lower layer pictures of the plurality of pictures are decoded. For example, as illustrated in FIG. 4 or FIG. 6, pictures I0, P4, B2, I8, B6, and the like which are the plurality of lower layer pictures are decoded at the same timing between the case where the decoding is performed at 120 fps and the case where the decoding is performed at 60 fps. Therefore, the image decoding apparatus does not need to change the timing for decoding each of the plurality of lower layer pictures between the case where all the pictures of the encoded stream are decoded and the case where only the plurality of lower layer pictures are decoded. Therefore, the processing load of the image decoding apparatus can be further alleviated.

In the determining of the decoding time in step S101, the decoding time of each of the plurality of uppermost layer pictures which are some pictures of the plurality of pictures included in the motion picture and which belong to the highest layer is determined to be between the decoding times of the plurality of lower layer pictures. For example, in the example as illustrated in FIG. 6, the decoding time of picture B1 which is an uppermost layer picture is determined to be between picture P4 and picture B2 which are lower layer pictures, and the decoding time of picture B3 which is an uppermost layer picture is determined to be between picture B2 and picture I8 which are lower layer pictures.

Therefore, when the encoded stream is decoded, the uppermost layer picture and the lower layer picture are alternately decoded. Therefore, the interval of the time for decoding each of the plurality of lower layer pictures in the encoded stream is longer than the interval of the time for decoding each of all the pictures of the decoded stream. As a result, the image decoding apparatus can decode each picture at a surely lower frame rate when the image decoding apparatus decodes only the plurality of lower layer pictures than when the image decoding apparatus decodes each of all the pictures in the decoded stream. Therefore, the processing load of the image decoding apparatus can be reliably alleviated.

In the determining of the decoding time in step S101, the decoding times of the plurality of pictures included in the motion picture are determined such that twice the time of the interval of decoding times of an uppermost layer picture and a lower layer picture which are of the plurality of uppermost layer pictures and the plurality of lower layer pictures and which are continuous in the decoding order is equal to the regular interval of time explained above. For example, in the example as illustrated in FIG. 6, the interval of the decoding time of each of picture B1, that is, an uppermost layer picture, and picture B2, that is, a lower layer picture, which are continuous in the decoding order is $T=1/120$ seconds. Accordingly, in step S101, the decoding time of each of the plurality of pictures included in the motion picture is determined such that $2 \times T=1/60$ seconds is equal to the regular interval of time explained above.

Therefore, any interval of the decoding time of each of the plurality of lower layer pictures is the interval of the decoding time of each of an uppermost layer picture and a lower layer picture which are continuous in the decoding order, and more specifically, any interval of the decoding time of each of the plurality of lower layer pictures is twice the interval of the time for decoding each of all the pictures in the decoded stream. Therefore, in a case where a frame rate for decoding and displaying all the pictures of the encoded stream is 120 fps, the image decoding apparatus can decode each of the plurality of lower layer pictures included in the encoded stream at a time interval of a reciprocal of a frame rate of 60 fps without any load.

In a case where the motion picture includes a plurality of random access units including a plurality of pictures which are continuous in the decoding order, the decoding time may be determined as follows in step S101. More specifically, in step S101, the decoding time of each picture in the random access unit is determined for each of the random access units, such that, in the random access unit, all the pictures except a picture displayed, in display order, before a picture at a head in decoding order can be decoded without referring to a picture included in another random access unit. In this case, the leading picture is an I picture (so-called IDR picture: Instantaneous Decoding Refresh Picture) in which a picture that is after the leading picture in decoding order is prohibited from referring to a picture that is before the leading picture in decoding order. Alternatively, the leading picture is an I picture (so-called CRA picture: Clean Random Access Picture) in which a picture that is after the leading picture in decoding order and before the leading picture in display order is permitted to refer to a picture that is before the leading picture in decoding order. For example, in this step S101, image encoding apparatus 100 determines the decoding time of each of the plurality of pictures included in the motion picture as illustrated in FIG. 6. In this example as illustrated in FIG. 6, picture I16 is a CRA picture in which picture B13 that is before picture I16 in display order refers to picture P12 in the first random access unit.

Therefore, for each of the random access units, the image decoding apparatus can appropriately decode each of the plurality of pictures included in the random access unit.

Description will now be given in detail of processing operation in which image encoding apparatus 100 determines decoding times of the plurality of pictures included in the motion picture as shown in the example of FIG. 6 in step S101.

In a case where a frame rate at which all the pictures included in encoded motion pictures are decoded and displayed is, for example, 120 fps, image encoding apparatus 100 determines the decoding time of each of all the pictures with a time unit (1/120 seconds) of the reciprocal of the frame rate (120 fps) in step S101. More specifically, the decoding time determined for each picture is expressed by a time obtained by adding an offset value to an integral multiple of the time unit. In step S101, first, image encoding apparatus 100 may determine TId of each of the plurality of pictures included in the motion picture, and may thereafter determine decoding order of each of the plurality of pictures. Then, image encoding apparatus 100 determines the DTS of each of the plurality of pictures with the time unit on the basis of the decoding orders thus determined.

For example, for each picture disposed in the display order, image encoding apparatus 100 determines TId which is a value for identifying the layer of the picture in a range equal to or more than zero and equal to or less than K (K is an integer equal to or more than 1). A layer with TId of K is the highest layer, and a layer with TId of 0 is the lowest layer. More specifically, deciding unit 101 determines TId of the leading I picture of the plurality of pictures arranged in the display order in the motion picture to be 0. Further, for every M (M is an integer equal to or more than 2) pictures (hereinafter referred to as a picture set) which are continuous in the plurality of picture subsequent to the leading I picture arranged in the display order, deciding unit 101 determines TId of the I picture or P picture which is the last picture of the picture set to be zero. In the picture set, the last picture in the display order is the I picture or P picture, TId of the I picture or P picture is determined to be 0. A picture of which TId is determined to be 0 is hereinafter referred to as the 0th hierarchical picture. For example, in the example as illustrated in FIG. 1A, four pictures including picture B1, picture B2, picture B3, and picture P4 correspond to the picture set. Then, picture P4 is determined to be the 0th hierarchical picture.

Subsequently, deciding unit 101 identifies, as a candidate picture, at least one picture which is other than the 0th hierarchical picture included in the picture set (for example, B picture) and which is a candidate for which TId is determined. This candidate picture is a picture that is displayed between two already-determined pictures of which TId are already determined. For example, in the example as illustrated in FIG. 1A, in a case where TId of each of picture I0 and picture P4 is already determined, picture I0 and picture P4 are already-determined pictures. In this case, in the picture set including pictures B1 to B3 and picture P4, picture B2 which is a picture displayed between picture I0 and picture P4 is identified as the candidate picture.

Further, when there are a plurality of candidate pictures thus determined, deciding unit 101 determines TId of the candidate leading picture in the display order among the plurality of candidate pictures to be a value N obtained by adding one to TId which is one of TIds of the two already-determined pictures, whichever is not a smaller one, corresponding to the candidate leading picture. For example, in the example as illustrated in FIG. 1B, in a case where TId of each of picture I0, picture P8, and picture B4 is already determined, picture I0, picture P8, and picture B4 are already-determined pictures. In this case, in the picture set including pictures B1 to B7, and picture P8, picture B2 which is a picture displayed between picture I0 and picture B4 and picture B6 which is a picture displayed between picture B4 and picture P8 are identified as the candidate pictures. Therefore, deciding unit 101 determines TId of one of candidate pictures B2 and B6 that is at the head in the display order, that is, TId of candidate picture B2, to be a value (N=2) that is obtained by adding one to TId=1 of TId of two already-determined pictures I0 and B4, whichever is not a smaller one, corresponding to candidate picture B2 at the head.

Deciding unit 101 repeats identification of such candidate picture and determination of TId until N falls within a range equal to or less than K and TIds of all the pictures other than the 0th hierarchical picture included in the picture set are determined. As a result, as illustrated in FIG. 1A or FIG. 1B, TId is determined for each picture.

Subsequently, deciding unit 101 determines the leading I picture to be a first element in the decoding order. For example, as illustrated in FIG. 6, deciding unit 101 determines picture I0 which is the leading I picture to be a first element in the decoding order.

Then, for each of the picture sets explained above, deciding unit 101 determines the decoding order of each of the plurality of pictures in the picture set. More specifically, in that picture set, deciding unit 101 determines the decoding order of the 0th hierarchical picture to be the head. Then, deciding unit 101 makes determination in order from a picture that is before another picture in the display order among the plurality of pictures other than the 0th hierarchical picture included in the picture set, and determines the decoding order of the picture in question to be immediately after the decoding order that has already been determined. For example, in the picture set including pictures B1 to B7 and picture P8, deciding unit 101 determines the decoding order of picture P8 which is the 0th hierarchical picture to be at the head. Then, deciding unit 101 determines the decoding order of pictures B1 to B3 in such a manner that picture B1, picture B2, and picture B3 are subsequent to picture P8.

Deciding unit 101 determines that the plurality of picture sets arranged in the display order are decoded in arrangement order. More specifically, deciding unit 101 determines the decoding order at the head in the picture set to be the last in the decoding order of a picture set immediately before in the display order, or to be an ordinal number obtained by adding one to the decoding order of the leading I picture explained above (picture I0).

Further, when deciding unit 101 determines the decoding time of the leading I picture (picture I0), deciding unit 101 determines the decoding time of a picture (picture P4) immediately after the picture in question in the decoding order of the I picture to be a time obtained by adding the time unit (¹⁄₁₂₀ seconds)×2 explained above to the decoding time of the I picture. Deciding unit 101 determines the decoding time of each picture that is after, in the decoding order, the picture (picture P4) immediately after the picture in question, to be a time obtained by adding the time unit explained above to the decoding time of the picture immediately before the picture in question in the decoding order.

As described above, deciding unit 101 determines the decoding time of each picture, so that the decoding time of each of the plurality of lower layer pictures becomes an regular interval, that is, an interval of the time unit (¹⁄₁₂₀ seconds)×2.

In the determining of the decoding time in step S101, in a case where a frame rate at which all the pictures included in the encoded motion picture are decoded and displayed is f, the decoding time of each of all the pictures is determined such that the decoding time of each of the plurality of lower layer pictures included in all the pictures is spaced apart by a time indicated by n times (n is an integer equal to or more than 2) a reciprocal of the f.

Therefore, the image decoding apparatus can decode each of the plurality of lower layer pictures at a time interval which is n times a reciprocal of that frame rate in order without any load.

In an image encoding method according to one aspect of the present disclosure, further, display delay information indicating a display delay which is a time between a decoding time of a picture at a head in the decoding order included in the motion picture and a display time of the leading picture in the display order included in the motion picture may be incorporated into the encoded stream.

Therefore, the image decoding apparatus can obtain the display delay information from the encoded stream. Therefore, as illustrated in FIG. 8, when the image decoding apparatus starts decoding the encoded stream from a time before the display start time by the display delay indicated by the display delay information, the image decoding apparatus can display the motion picture without delay from the display start time.

In an image encoding method according to one aspect of the present disclosure, further, non-regular interval information indicating that decoding times determined for the plurality of pictures included in the motion picture are not spaced at regular intervals may be incorporated into the encoded stream.

Therefore, the image decoding apparatus can obtain the non-regular interval information from the encoded stream. Therefore, the image decoding apparatus can determine that each of the plurality of pictures included in the encoded stream cannot be decoded in order at the frame rate of the display. As a result, in accordance with a flowchart as illustrated in FIG. 10, while the image decoding apparatus refers to the decoding time determined for each of the plurality of pictures included in the encoded stream, the image decoding apparatus can decode the plurality of pictures at appropriate timing.

Figure 15C:
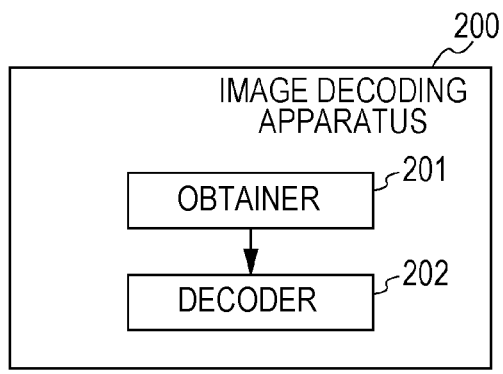
FIG. 15C is a block diagram illustrating an image decoding apparatus according to an aspect of the present disclosure.

FIG. 15C is a block diagram of an image decoding apparatus according to an aspect of the present disclosure.

Image decoding apparatus 200 according to an aspect of the present disclosure is an apparatus for decoding an encoded stream including an encoded motion picture for each picture which belongs to any one of a plurality of layers, without referring to another picture which belongs to a layer higher than the layer which the picture in question belongs. Image decoding apparatus 200 includes obtainer 201 and decoder 202.

Obtainer 201 obtains a decoding time of each of the plurality of pictures included in the encoded stream from the encoded stream. In this case, the decoding time of each of the plurality of pictures is determined as follows. More specifically, these decoding times are determined such that decoding times of a plurality of lower layer pictures which are some pictures of the plurality of pictures included in the encoded stream and which do not belong to a highest layer of the plurality of layers are spaced at regular intervals. Further, these decoding times are determined such that timing for decoding each of the plurality of lower layer pictures is caused to be identical between a case where the plurality of pictures included in the encoded stream are decoded and a case where only the plurality of lower layer pictures of the plurality of pictures are decoded Decoder 202 decodes each of the plurality of pictures included in the encoded stream or the plurality of lower layer pictures in accordance with the obtained decoding time.

Figure 15D:
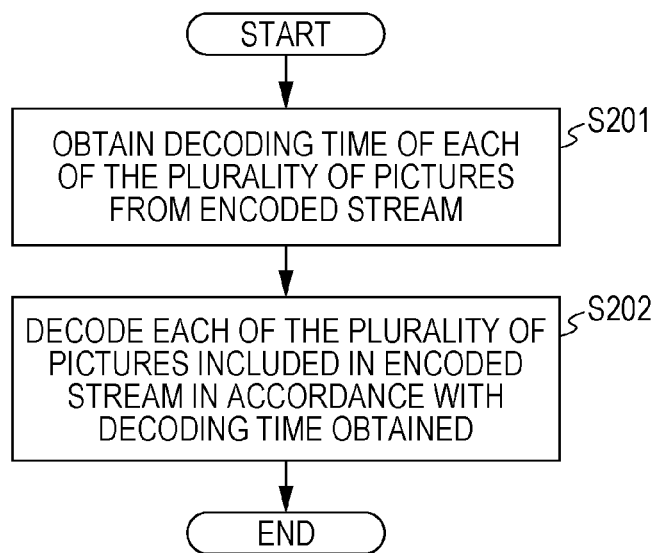
FIG. 15D is a flowchart illustrating an image decoding method according to an aspect of the present disclosure.

FIG. 15D is a flowchart illustrating an image decoding method according to an aspect of the present disclosure.

The image decoding method according to an aspect of the present disclosure is a method in which image decoding apparatus 200 decodes an encoded stream including an encoded motion picture for each picture which belongs to any one of a plurality of layers, without referring to another picture which belongs to a layer higher than the layer which the picture in question belongs. This image decoding method includes step S201 and step S202.

In step S201, the decoding time of each of the plurality of pictures included in the encoded stream is obtained from the encoded stream. In this case, the decoding time of each of the plurality of pictures is determined as follows. More specifically, the decoding times are determined such that decoding times of a plurality of lower layer pictures which are some pictures of the plurality of pictures included in the encoded stream and which do not belong to a highest layer of the plurality of layers are spaced at regular intervals. Further, the decoding times are determined such that timing for decoding each of the plurality of lower layer pictures is caused to be identical between a case where the plurality of pictures included in the encoded stream are decoded and a case where only the plurality of lower layer pictures of the plurality of pictures are decoded In step S202, each of the plurality of pictures included in the encoded stream or the plurality of lower layer pictures is decoded in accordance with the obtained decoding time.

Accordingly, each of the plurality of pictures included in the encoded stream is encoded without referring to another picture which belongs to a layer higher than the layer which the picture in question belongs. Therefore, image decoding apparatus 200 can decode only the plurality of lower layer pictures in the encoded stream. The decoding times of the plurality of lower layer pictures included in the encoded stream are spaced at the regular intervals. Therefore, when image decoding apparatus 200 decodes only the plurality of lower layer pictures in the encoded stream, image decoding apparatus 200 can decode the lower layer pictures in order at every lapse of regular interval of time. Therefore, when the regular interval is an appropriate time, the processing load of image decoding apparatus 200 can be alleviated. More specifically, image decoding apparatus 200 can perform decoding at a frame rate according to the processing performance of image decoding apparatus 200 without performing decoding of each picture at a high frame rate. Further, timing for decoding each of the plurality of lower layer pictures is identical between the case where the plurality of pictures included in the encoded stream (for example, all the pictures) are decoded and the case where only the plurality of lower layer pictures of the plurality of pictures are decoded. Therefore, image decoding apparatus 200 does not need to change the timing for decoding each of the plurality of lower layer pictures between the case where all the pictures of the encoded stream are decoded and the case where only the plurality of lower layer pictures are decoded. Therefore, the processing load of image decoding apparatus 200 can be further alleviated.

In an image decoding method according to an aspect of the present disclosure, further, in a case where decoding times of the plurality of pictures included in the encoded stream are not spaced at the regular interval, the decoding time of each of the plurality of pictures is changed to have the regular interval, and in the decoding of the encoded stream, each of the plurality of pictures included in the encoded stream or the plurality of lower layer pictures may be decoded in accordance with the changed decoding time.

Accordingly, for example, as illustrated in FIG. 11, the decoding time of each of the plurality of pictures is changed to have the regular interval, and therefore, image decoding apparatus 200 can decode each of the plurality of pictures included in the encoded stream at every lapse of regular interval of time. Therefore, the processing load of image decoding apparatus 200 can be further alleviated.

In an image decoding method according to an aspect of the present disclosure, in the determining of the encoded stream, a determination may be made, for each picture included in the encoded stream, as to whether the decoding time obtained for the picture matches generation timing at which a processing signal (corresponding to the video processing signal explained above) is generated at a cycle defined in advance, and when the decoding time is determined to match the generation timing, the picture may be decoded. For example, the image decoding method may further include determining a reciprocal of a frame rate at which all the pictures included in the encoded stream are decoded and displayed to be the cycle defined in advance.

Therefore, as shown in the flowchart of FIG. 10, even if the decoding times of the plurality of pictures are not spaced at regular intervals, each of the plurality of pictures can be decoded appropriately at the decoding time of the picture.

It should be noted that, in each of the exemplary embodiments, each constituent element may be implemented with dedicated hardware, or by executing a software program appropriate for each constituent element. Each constituent element may be implemented by causing a program execution unit such as a CPU or a processor to read and execute a software program recorded on a recording medium such as a hard disk or a semiconductor memory. In this case, the software that implements image encoding apparatuses 10 and 100 according to the exemplary embodiment or modifications causes a computer to execute each step included in the flowchart as illustrated in FIG. 15B. On the other hand, the software that implements image decoding apparatuses 20 and 200 according to the exemplary embodiment or modifications causes a computer to execute each step included in the flowchart as illustrated in FIG. 15D.

SECOND EXEMPLARY EMBODIMENT

A program for implementing a configuration of a motion picture encoding method (image encoding method) or a motion picture decoding method (image decoding method) as shown in each of the exemplary embodiments is recorded on a storage medium, so that the processing as shown in each of the exemplary embodiments can be implemented easily in a standalone computer system. The storage medium may be any given type of medium capable of storing a program, such as a magnetic disk, an optical disk, a magneto-optical disk, an IC (Integrated Circuit) card, or a semiconductor memory.

Now, exemplary applications of a motion picture encoding method (image encoding method) and a motion picture decoding method (image decoding method) as shown in each of the exemplary embodiments and systems using them will be further explained. The system is characterized in including an image encoding decoding apparatus including an image encoding apparatus using the image encoding method and an image decoding apparatus using the image decoding method. The other configurations of the systems can be changed as necessary in accordance with circumstances.

Figure 16:
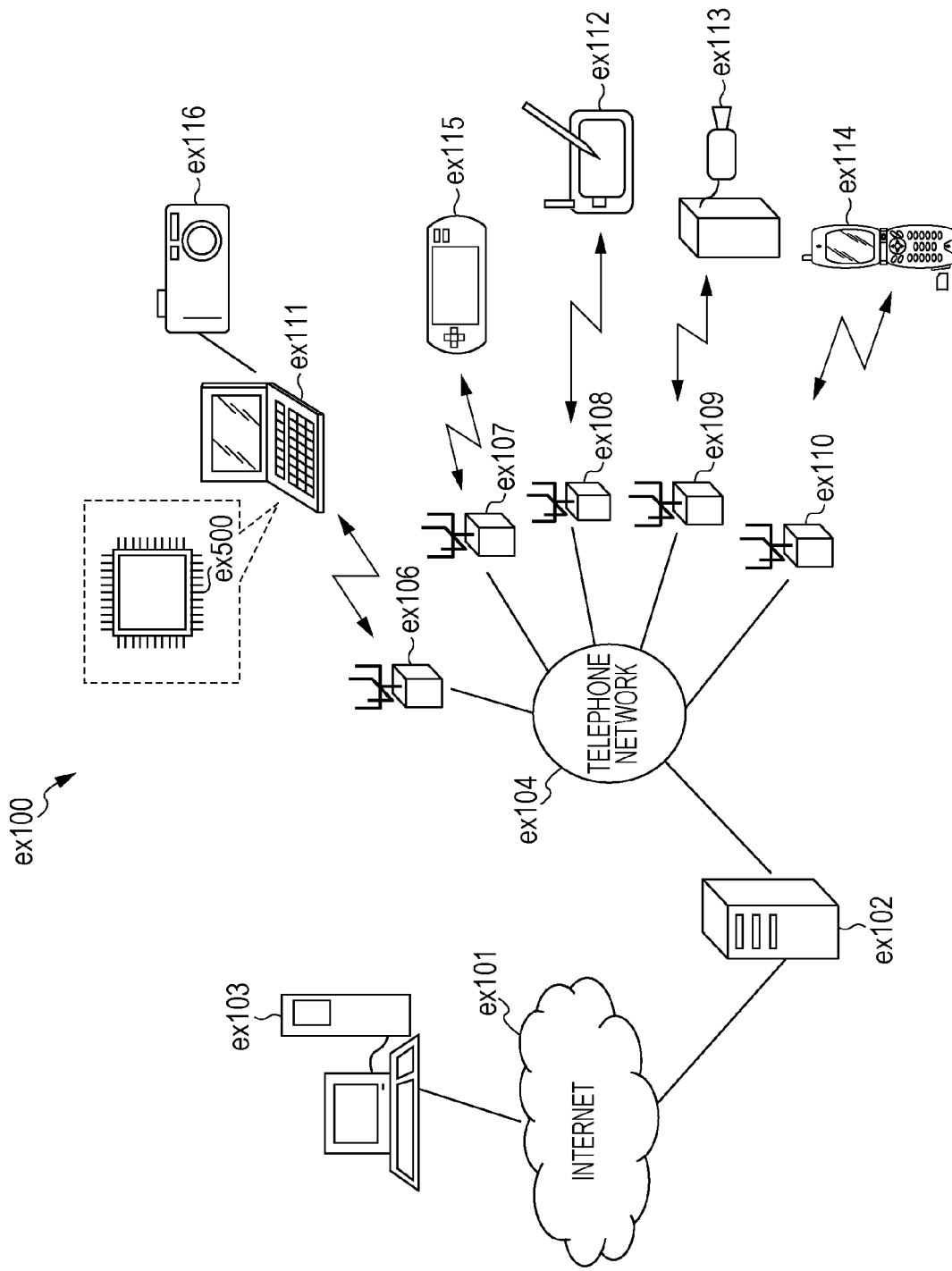
FIG. 16 is a diagram illustrating an entire configuration of a content providing system that implements content distribution services.

FIG. 16 is a diagram illustrating an entire configuration of content providing system ex100 that implements content distribution services. An area in which communication services are provided is divided into cells of a desired size, and base stations ex106, ex107, ex108, ex109, and ex110, which are fixed wireless stations, are installed in the respective cells.

In content providing system ex100, various devices, such as computer ex111, PDA (Personal Digital Assistant) ex112, camera ex113, mobile phone ex114, game machine ex115, are connected to Internet ex101 via Internet service provider ex102 and telephone network ex104, and base stations ex106 to ex110.

However, the configuration of content providing system ex100 is not limited to the configuration as illustrated in FIG. 16. Alternatively, any given combination of the elements may be connected. Each device may be directly connected to the telephone network ex104 without relying on base stations ex106 to ex110 which are the fixed wireless stations. Still alternatively, the devices may be directly interconnected via a near field communication or the like.

Camera ex113 is a device capable of capturing motion pictures, such as a digital camcorder. Camera ex116 is a device capable of capturing still pictures and motion pictures, such as a digital camera. Moreover, mobile phone ex114 may be any of a mobile phone based on GSM (registered trademark) (Global System for Mobile Communications) scheme, CDMA (Code Division Multiple Access) scheme, W-CDMA (Wideband-Code Division Multiple Access) scheme, or LTE (Long Term Evolution) scheme, HSPA (High Speed Packet Access); or PHS (Personal Handyphone System); and the like.

In content providing system ex100, camera ex113 or the like is connected via base station ex109 and telephone network ex104 to streaming server ex103, so that live streaming or the like is implemented. During live streaming, encoding processing is performed on content (for example, video and the like of music event) captured by the user using camera ex113 in a manner as explained in each of the exemplary embodiments (that is, camera ex113 functions as the image encoding apparatus according to an aspect of the present disclosure), and the encoded content is transmitted to streaming server ex103. On the other hand, streaming server ex103 distributes the received content data as a stream to a client that has made a request. Examples of the client include computer ex111, PDA ex112, camera ex113, mobile phone ex114, and game machine ex115 capable of decoding the data that has been subjected to the encoding processing. Each device that has received the distributed data performs the decoding processing on the received data to reproduce the data (that is, the device functions as the image decoding apparatus according to an aspect of the present disclosure).

It should be noted that the encoding processing may be performed on the captured data by camera ex113, by streaming server ex103 that performs transmission processing of data, or by both of them on a processing-sharing basis. Likewise, the decoding processing may be performed on the distributed data by a client, by streaming server ex103, or by both of them on a processing-sharing basis. Moreover, still and/or motion picture data captured by not only camera ex113 but also camera ex116 may be transmitted via computer ex111 to streaming server ex103. The encoding processing in this case may be performed by any of camera ex116, computer ex111, and streaming server ex103, or by all of them on a processing-sharing basis.

These pieces of encoding and decoding processing are generally performed by LSI ex500 included in computer ex111 or each device. LSI ex500 may be formed as a single chip or multiple chips. It should be noted that software for motion picture encoding and decoding may be recorded on any given recording medium (such as a CD-ROM, a flexible disk, or a hard disk) that is readable by computer ex111 or the like, and the encoding and decoding processing may be performed by using the software. Further, in a case where mobile phone ex114 is equipped with a camera, motion picture data obtained by the camera may be transmitted. Motion picture data at this occasion is data that has been subjected to the encoding processing by LSI ex500 included in mobile phone ex114.

Streaming server ex103 may be a plurality of servers or a plurality of computers that process, record, and distribute data in a distributed manner.

As described above, content providing system ex100 allows the client to receive and reproduce encoded data. In this manner, content providing system ex100 allows the client to receive, decode, and reproduce information transmitted by the user in real time, and thus allows a user who does not have any special rights or equipment to implement personal broadcasting.

Figure 17:
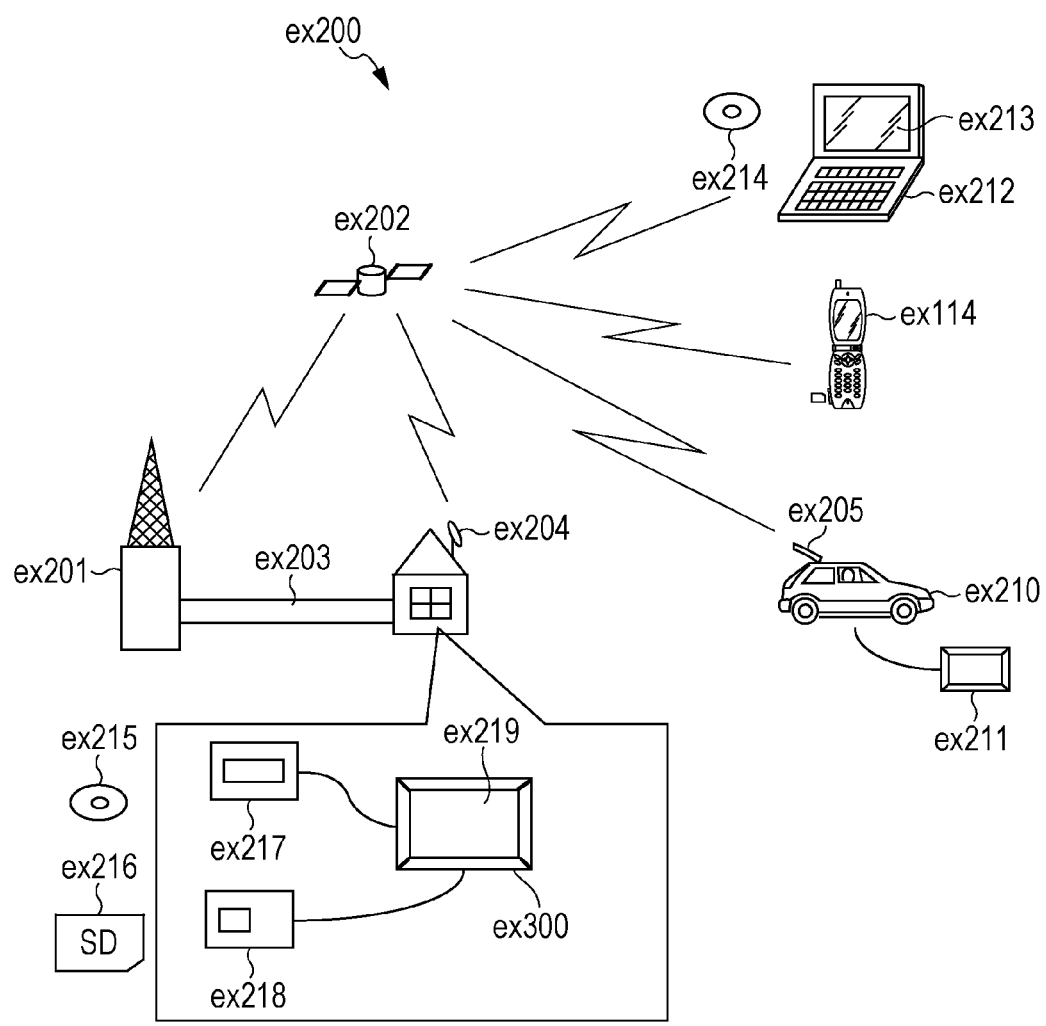
FIG. 17 is a diagram illustrating an entire configuration of a digital broadcasting system.

It should be noted that, in addition to the example of content providing system ex100, at least one of the motion picture encoding apparatus (image encoding apparatus) and the motion picture decoding apparatus (image decoding apparatus) according to each of the exemplary embodiments can be incorporated into digital broadcasting system ex200 as illustrated in FIG. 17. More specifically, in broadcasting station ex201, multiplexed data obtained by multiplexing music data with video data is transmitted via a radio wave to communication or satellite ex202. This video data is data encoded in accordance with a motion picture encoding method explained in each of the exemplary embodiments (more specifically, this video data is data encoded by the image encoding apparatus according to an aspect of the present disclosure). Broadcasting satellite ex202 having received this data transmits a broadcast radio wave, and home antenna ex204 capable of receiving satellite broadcasting receives this radio wave. An apparatus such as television set (receiver) ex300 or set top box (STB) ex217 decodes and reproduces the received multiplexed data (that is, the apparatus functions as the image decoding apparatus according to an aspect of the present disclosure).

The motion picture decoding apparatus or the motion picture encoding apparatus as shown in each of the exemplary embodiments can also be implemented in reader/recorder ex218 for reading and decoding multiplexed data recorded on recording medium ex215 such as DVD or BD; or encoding a video signal and in some cases, multiplexing the data with a music signal and writing the multiplexed data on recording medium ex215. In this case, the reproduced video signal is displayed on monitor ex219, and the video signal can be reproduced by another apparatus or system using recording medium ex215 having the multiplexed data recorded thereon. Alternatively, the motion picture decoding apparatus may be implemented in set top box ex217 connected to cable ex203 for a cable television set or antenna ex204 for satellite/terrestrial wave broadcasting, and the video signal may be displayed on monitor ex219 of the television set. At this occasion, the motion picture decoding apparatus may be incorporated into the television set instead of the set top box.

Figure 18:
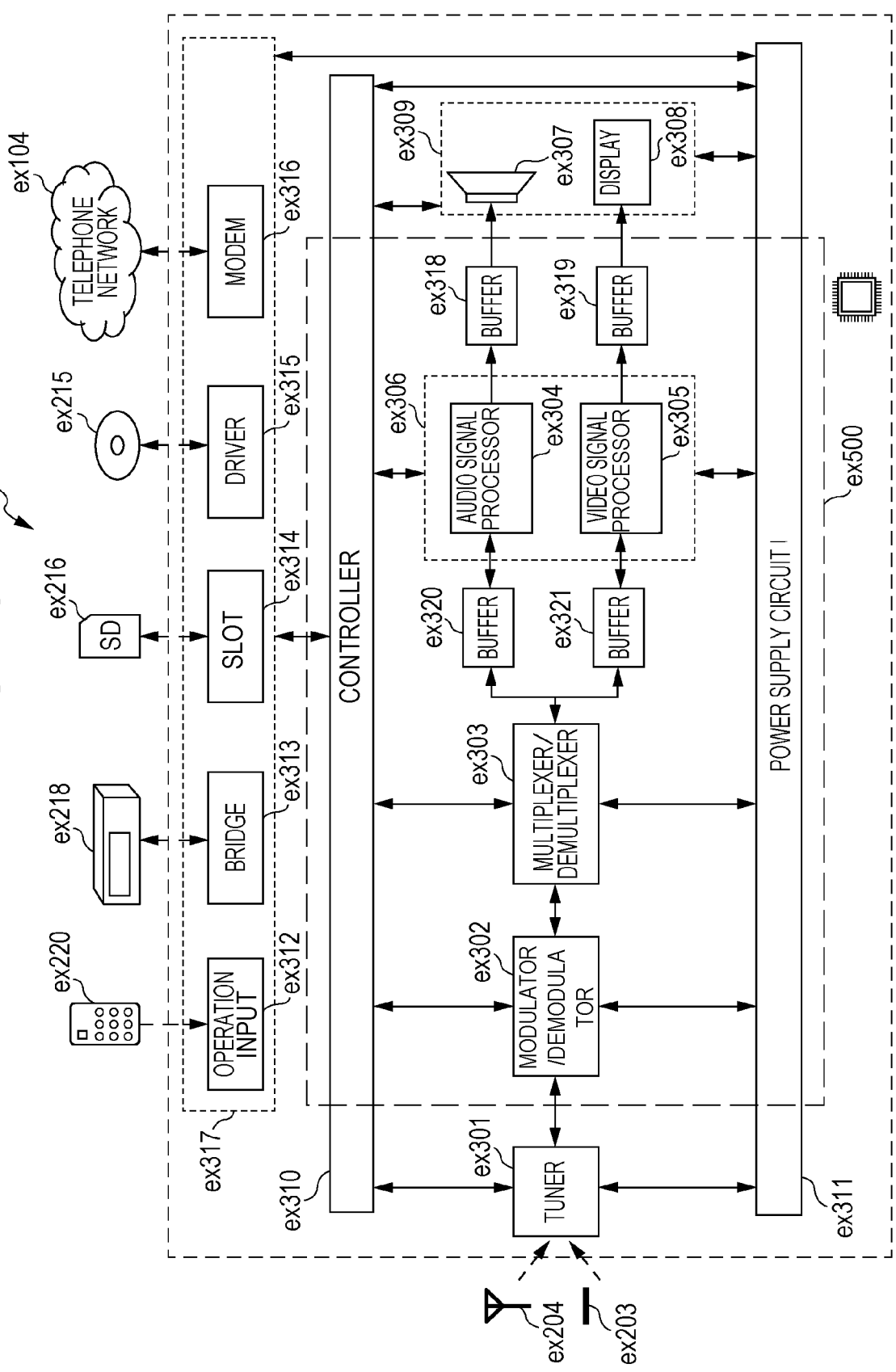
FIG. 18 is a block diagram illustrating an example of a configuration of a television set.

FIG. 18 is a diagram illustrating television set (receiver) ex300 that employs the motion picture decoding method and the motion picture encoding method explained in each of the exemplary embodiments. Television set ex300 includes tuner ex301 for obtaining or outputting multiplexed data obtained by multiplexing video data with audio data via antenna ex204, cable ex203, or the like that receives the broadcast, modulator/demodulator ex302 for demodulating the received multiplexed data or modulating multiplexed data to be transmitted to the outside, and multiplexer/demultiplexer ex303 for demultiplexing the demodulated multiplexed data into video data and audio data or multiplexing the video data and the audio data encoded by signal processor ex306.

In addition, television set ex300 includes signal processor ex306 and output unit ex309. Signal processor ex306 includes audio signal processor ex304 that decodes audio data or encodes information about audio data, and video signal processor ex305 that decodes video data or encodes information about video data (video signal processor ex305 functions as an image encoding apparatus or an image decoding apparatus according to an aspect of the present disclosure). Output unit ex309 includes speaker ex307 that outputs a decoded audio signal and display ex308, such as a display, that displays a decoded video signal. Television set ex300 further includes interface unit ex317 including operation input ex312 that accepts input of user operation. Television set ex300 further includes controller ex310 that controls each unit in an integrated manner, and power supply circuit ex311 that supplies electric power to each unit. Interface unit ex317 may include not only operation input ex312 but also bridge ex313 to be connected to an external device such as reader/recorder ex218, slot ex314 to which recording medium ex216 such as SD card can be connected, driver ex315 for connection to an external recording medium such as a hard disk, modem ex316 for connection to a telephone network, and the like. It should be noted that recording medium ex216 can electrically record information with a non-volatile/volatile semiconductor memory element stored therein. The individual units of television set ex300 are connected to one another via a synchronization bus.

First, a configuration will be explained in which television set ex300 decodes and reproduces multiplexed data obtained from the outside with antenna ex204 and the like. Television set ex300 receives a user operation from remote controller ex220 and the like, and multiplexer/demultiplexer ex303 demultiplexes multiplexed data demodulated by modulator/demodulator ex302 on the basis of control performed by controller ex310 having a CPU and the like. Further, in television set ex300, audio signal processor ex304 decodes the separated audio data, and video signal processor ex305 decodes the separated video data by using a decoding method explained in each of the exemplary embodiments. The decoded audio signal and the video signal are output to the outside from the output unit ex309. When the audio signal and the video signal are output, the audio signal and the video signal may be temporarily accumulated in buffers ex318 and ex319 or the like such that the audio signal and the video signal are reproduced in synchronization with each other. Instead of broadcasting and the like, television set ex300 may read multiplexed data from recording media ex215 and ex216 such as a magnetic/optical disk and an SD card. Subsequently, a configuration will be explained in which television set ex300 encodes the audio signal and the video signal, and transmits the encoded signals to the outside or writes the encoded signals on a recording medium or the like. Television set ex300 receives a user operation from remote controller ex220 or the like, and on the basis of control performed by controller ex310, audio signal processor ex304 encodes the audio signal, and video signal processor ex305 encodes the video signal by using the encoding method explained in each of the exemplary embodiments. The encoded audio signal and the video signal are multiplexed by multiplexer/demultiplexer ex303, and the multiplexed signal is output to the outside. When the audio signal and the video signal are multiplexed, the audio signal and the video signal may be temporarily accumulated in buffers ex320 and ex321 or the like such that the audio signal and the video signal are synchronized with each other. It should be noted that multiple buffers may be provided as illustrated as buffers ex318, ex319, ex320 and ex321; or one or more buffers may be shared. Further, other than the buffers illustrated in the drawings, for example, data may be stored in a buffer serving as a buffering member for avoiding an overflow or underflow in the system between modulator/demodulator ex302, multiplexer/demultiplexer ex303, or the like.

Television set ex300 may have a configuration of receiving an AV input of a microphone and a camera in addition to the configuration of obtaining audio data and video data from broadcasting and the like and a recording medium and the like, and may perform encoding processing on the data obtained therefrom. It should be noted that, in this case, television set ex300 is explained as a configuration capable of performing the encoding processing, multiplexing, and outputting to outside. Alternatively, television set ex300 may be a configuration incapable of performing these processing, and only capable of performing the reception, decoding processing, and outputting to outside.

In a case where reader/recorder ex218 reads or writes multiplexed data from or to a recording medium, the decoding processing or the encoding processing may be performed by any of television set ex300 and reader/recorder ex218, or by both television set ex300 and reader/recorder ex218 on a processing-sharing basis.

Figure 19:
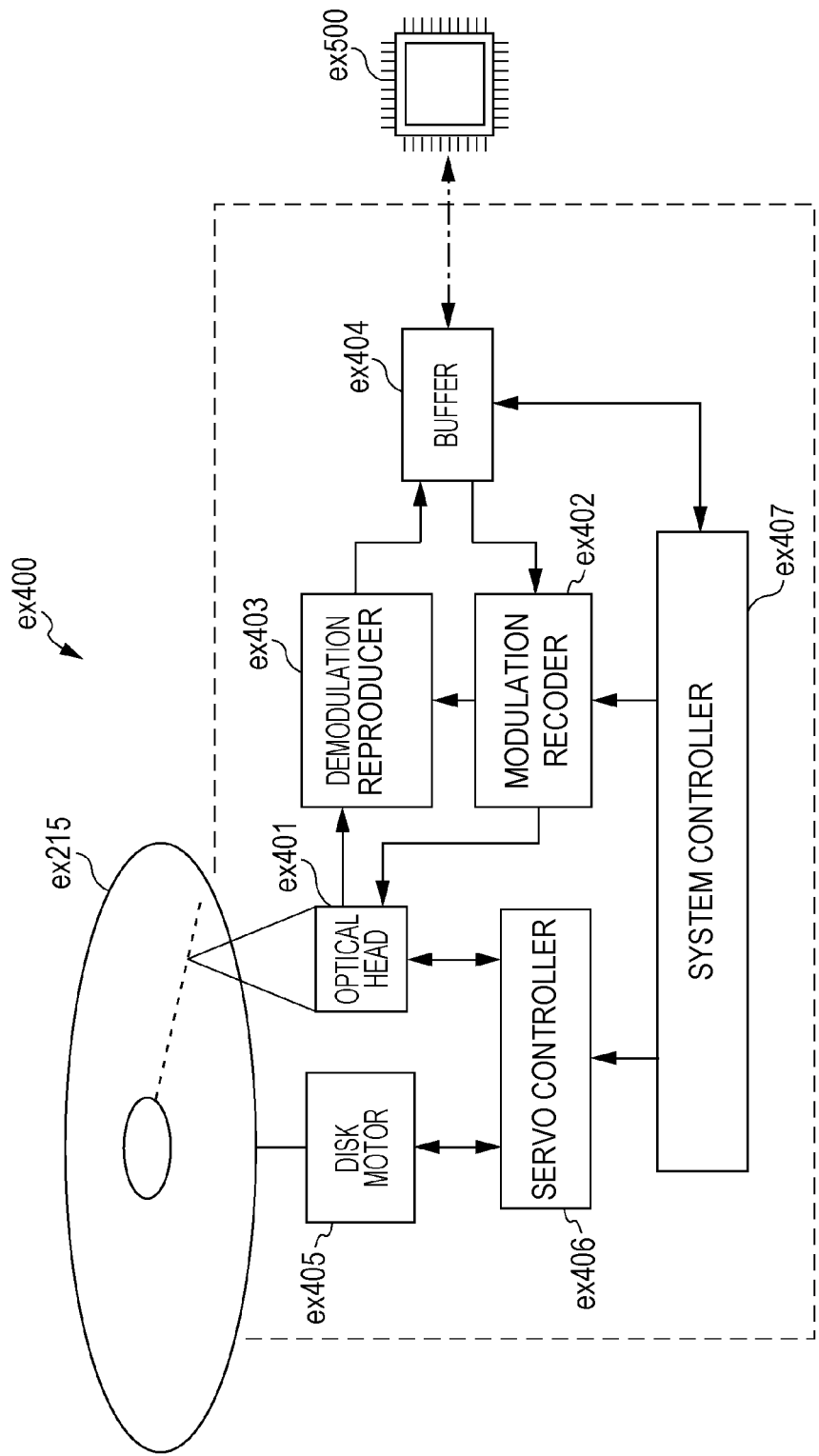
FIG. 19 is a block diagram illustrating an example of a configuration of an information reproducing/recording unit that reads information from and writes information to a recording medium which is an optical disk.

FIG. 19 illustrates an example of a configuration of information reproducing/recording unit ex400 in a case where data is read or written from or to an optical disk. Information reproducing/recording unit ex400 includes elements ex401, ex402, ex403, ex404, ex405, ex406, and ex407 explained below. Optical head ex401 irradiates a recording surface of recording medium ex215, which is an optical disk, with a laser spot to write information thereon; and detects reflected light from the recording surface of the recording medium ex215 to read information. Modulation recorder ex402 electrically drives a semiconductor laser included in optical head ex401 to modulate the laser light according to the recorded data. Demodulation reproducer ex403 amplifies a reproduced signal obtained by electrically detecting reflected light from the recording surface by a photodetector included in optical head ex401, and separates and demodulates signal components recorded on recording medium ex215, and reproduces necessary information. Buffer ex404 temporarily holds information to be recorded on recording medium ex215 and information reproduced from recording medium ex215. Disk motor ex405 rotates recording medium ex215. Servo controller ex406 performs tracking processing of the laser spot by moving optical head ex401 to predetermined information track while controlling rotation and driving of disk motor ex405. System controller ex407 controls the entire information reproducing/recording unit ex400. The above reading and writing processing is implemented when system controller ex407 uses various pieces of information held in buffer ex404, generates and adds new information as necessary, causes modulation recorder ex402, demodulation reproducer ex403, and servo controller ex406 to perform cooperation operation, and perform recording and reproduction of information via optical head ex401. System controller ex407 includes, for example, a microprocessor and executes these processing by executing a reading or writing program.

Although optical head ex401 that irradiates the recording surface with a laser spot has been described above, optical head ex401 may include a configuration of performing high density recording by using near field light.

Figure 20:
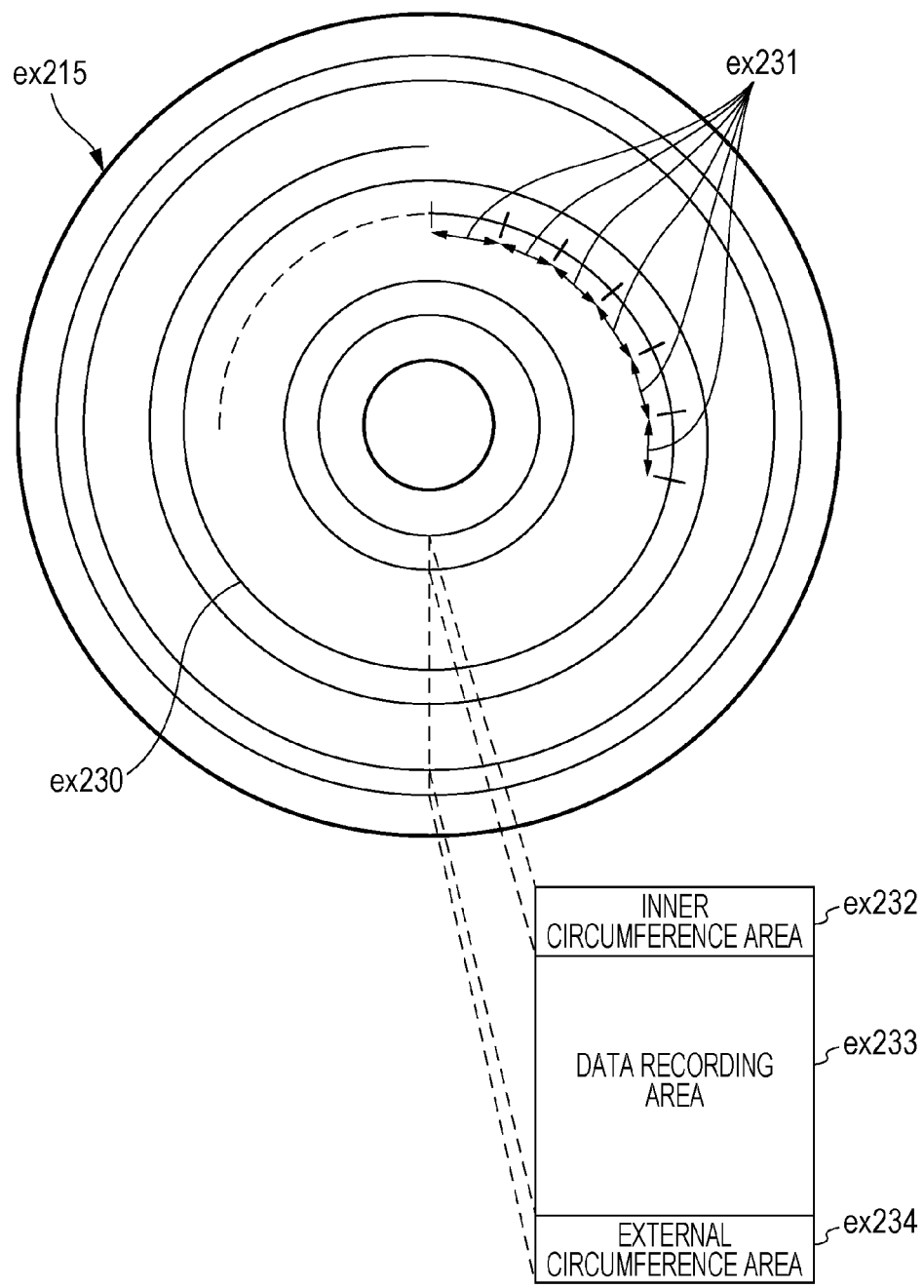
FIG. 20 is a diagram illustrating an example of a structure of a recording medium which is an optical disk.

FIG. 20 is a schematic diagram of recording medium ex215 which is an optical disk. On the recording surface of recording medium ex215, guiding grooves (groups) are formed in a spiral form, and address information representing an absolute position on the disk is recorded in advance in information track ex230 by using a change in the shape of the groove. This address information includes information for identifying the position of recording block ex231 which is a unit for recording data, and when the apparatus for performing recording and reproduction reproduces information track ex230 and reads the address information, the recording block can be identified. Recording medium ex215 includes data recording area ex233, inner circumference area ex232, and external circumference area ex234. An area used to record the user data is data recording area ex233, and inner circumference area ex232 and external circumference area ex234 that are disposed at the inner side or the outer side of data recording area ex233 are used for the identification purpose other than recording of the user data. Information reproducing/recording unit ex400 reads and writes encoded audio data, video data, or multiplexed data obtained by multiplexing the data from and to data recording area ex233 of such recording medium ex215.

The description has been given using a one layer optical disk such as DVD or BD as an example, but the optical disk used is not limited thereto. An optical disk having a multilayer structure and capable of recording on a part other than the front surface may be used. Alternatively, it may be an optical disk having a structure for multi-dimensional recording and reproduction, for example, recording information by using color lights having various different wavelengths in the same location of the disk, and recording a layer of different information in various angles.

In digital broadcasting system ex200, vehicle ex210 equipped with antenna ex205 may receive data from satellite ex202 or the like, and a display device such as car navigation ex211 mounted on vehicle ex210 may reproduce a motion picture. For example, it should be noted that the configuration of car navigation ex211 may be considered to be a configuration including a GPS reception unit in addition to the configuration as illustrated in FIG. 18, and the same applies to computer ex111, mobile phone ex114, and the like.

Figure 21A:
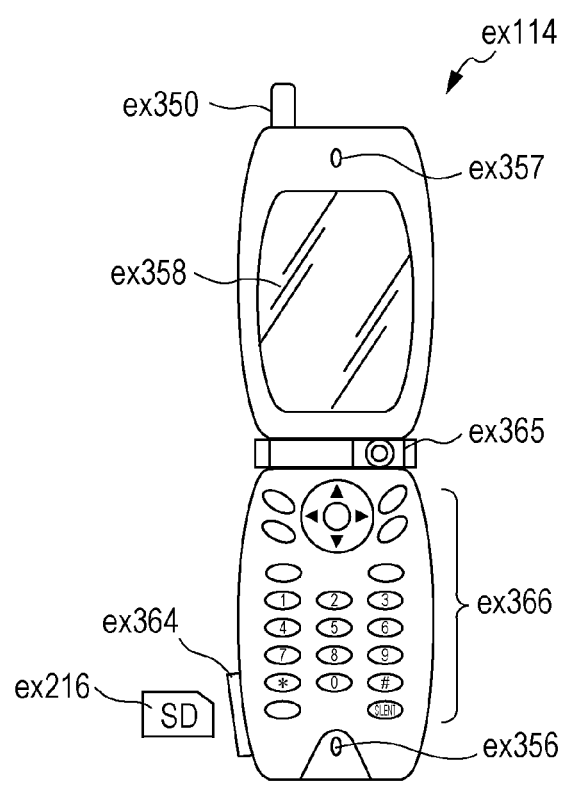
FIG. 21A is a diagram illustrating an example of a mobile phone.

FIG. 21A is a diagram illustrating mobile phone ex114 using the motion picture decoding method and the motion picture encoding method explained in the exemplary embodiment. Mobile phone ex114 includes antenna ex350 for transmitting and receiving a radio wave to and from base station ex110; camera unit ex365 capable of capturing video and still pictures; and display ex358, such as a liquid crystal display, for displaying video captured by camera unit ex365 and data obtained by decoding video and the like received by antenna ex350. Mobile phone ex114 further includes a body having operation key unit ex366; audio output unit ex357 such as a speaker for outputting audio; audio input ex356 such as a microphone for inputting audio; memory ex367 that stores encoded data or decoded data such as captured video, captured still pictures, recorded audio, or received video, received still pictures, and received emails; and slot ex364 which is an interface to a recording medium which similarly stores data thereon.

Figure 21B:
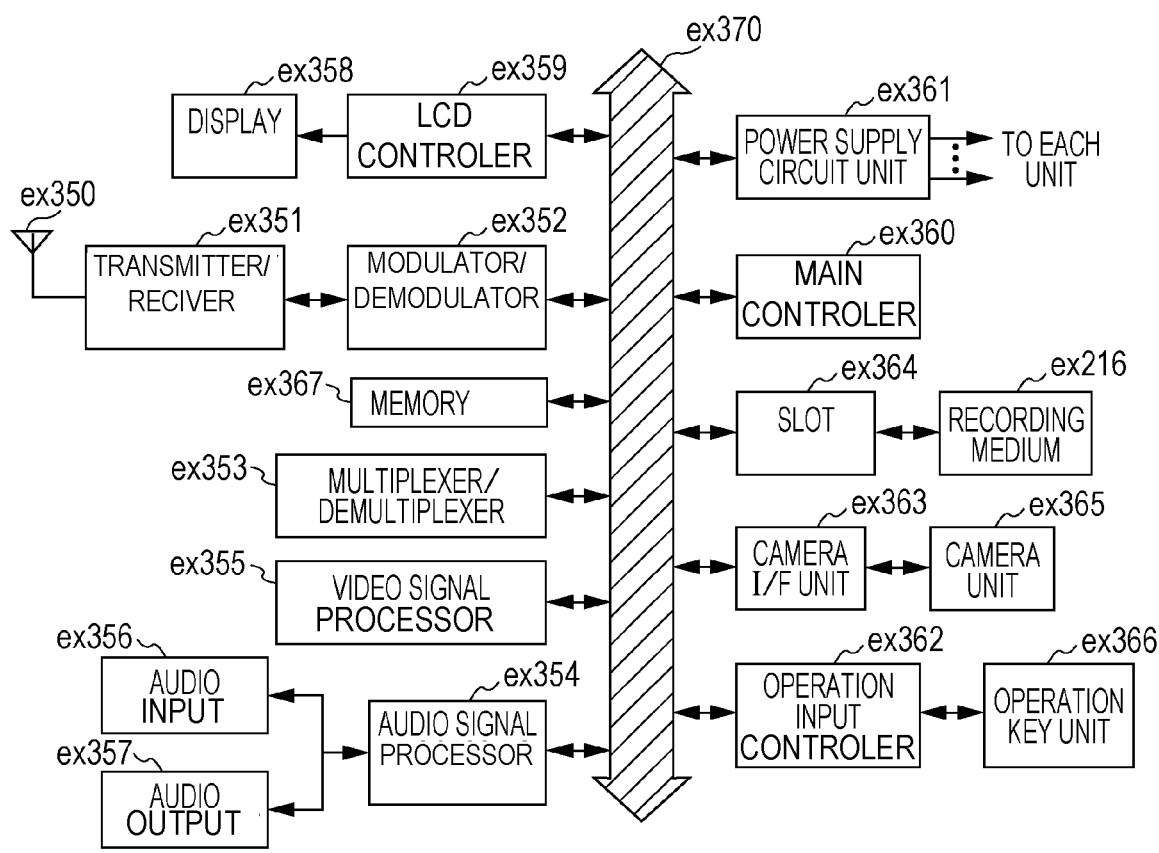
FIG. 21B is a block diagram illustrating an example of a configuration of the mobile phone.

Further, an example of a configuration of mobile phone ex114 will be explained with reference to FIG. 21B. Mobile phone ex114 includes power supply circuit ex361, operation input controller ex362, video signal processor ex355, camera interface unit ex363, LCD (Liquid Crystal Display) controller ex359, modulation/demodulation unit ex352, multiplexer/demultiplexer ex353, audio signal processor ex354, slot ex364, and memory ex367 are connected with each other via bus ex370 to main controller ex360 that controls each unit of the body having display ex358 and operation key unit ex366 in an integrated manner.

When an on-hook/power key is turned on through a user operation, power supply circuit ex361 activates mobile phone ex114 to cause mobile phone ex114 to be in operable state by supplying electric power to each unit from the battery pack.

On the basis of control performed by main controller ex360 having a CPU, a ROM, a RAM, and the like, mobile phone ex114 causes audio signal processor ex354 to convert an audio signal collected by audio input ex356 in audio voice call mode into a digital audio signal, and causes modulation/demodulation unit ex352 to perform spread spectrum processing the digital audio signal, and causes transmission/reception unit ex351 to perform digital analog conversion processing and frequency conversion processing on the digital audio signal and thereafter transmits the signal via antenna ex350. Mobile phone ex114 amplifies received data received via antenna ex350 in audio voice call mode and performs frequency conversion processing and analog digital conversion processing on the data, and causes modulation/demodulation unit ex352 to perform inverse spread spectrum processing on the data, and causes audio signal processor ex354 to convert it into an analog audio signal, and thereafter outputs the analog audio signal from audio output unit ex357.

Further, in a case where an e-mail is transmitted in data communication mode, text data of an e-mail which is input by operation with operation key unit ex366 and the like of the body are transmitted via operation input controller ex362 to main controller ex360. Main controller ex360 causes modulation/demodulation unit ex352 to perform spread spectrum processing on text data and causes transmission/reception unit ex351 to perform digital analog conversion processing and frequency conversion processing on the text data, and thereafter transmits the data via antenna ex350 to base station ex110. In a case where an e-mail is received, substantially opposite processing is performed on the received data, and the data is output to display ex358, In a case where video, still picture, or video and audio are transmitted in data communication mode, video signal processor ex355 compresses and encodes the video signal provided from camera unit ex365 in accordance with a motion picture encoding method indicated by each of the exemplary embodiments (that is, video signal processor ex355 functions as an image encoding apparatus according to an aspect of the present disclosure), and transmits the encoded video data to multiplexer/demultiplexer ex353. Audio signal processor ex354 encodes the audio signal collected by audio input ex356 while camera unit ex365 captures video, still pictures, and the like, and transmits the encoded audio data to multiplexer/demultiplexer ex353.

Multiplexer/demultiplexer ex353 multiplexes the encoded video data provided from video signal processor ex355 and the encoded audio data provided from audio signal processor ex354 in accordance with a predetermined method, and causes modulation/demodulation unit (modulation/demodulation circuit) ex352 to perform spread spectrum processing on the multiplexed data obtained as a result, and causes transmission/reception unit ex351 to perform digital analog conversion processing and frequency conversion processing on the multiplexed data, and thereafter, transmits the data via antenna ex350.

In a case where data of a motion picture file linked to a home page and the like is received in data communication mode, or in a case where an e-mail attached with video and/or audio is received, multiplexer/demultiplexer ex353 demultiplexes multiplexed data to divide the multiplexed data into the bit stream of the video data and the bit stream of the audio data in order to decode the multiplexed data received via antenna ex350, and provides the encoded video data via synchronization bus ex370 to video signal processor ex355, and provides the encoded audio data to audio signal processor ex354. Video signal processor ex355 decodes the video signal by decoding the video signal in accordance with a motion picture decoding method corresponding to a motion picture encoding method indicated by each of the exemplary embodiments (that is, video signal processor ex355 functions as an image decoding apparatus according to an aspect of the present disclosure), so that, for example, video and still pictures included in a motion picture file linked to a home page are displayed on display ex358 via LCD controller ex359. Audio signal processor ex354 decodes the audio signal, and audio output unit ex357 outputs the audio.

Like television set ex300, the terminal of mobile phone ex114 and the like is considered to be in three types of implementation forms, that is, not only a transmission and reception type terminal having both of an encoding device and a decoding device, but also a transmission terminal having only an encoding device and a reception terminal having only a decoding device. Further, the case has been described in which multiplexed data obtained by multiplexing music data with video data are received and transmitted in digital broadcasting system ex200. Alternatively, the multiplexed data may be data in which text data related to the video is multiplexed other than audio data or video data alone may be used instead of the multiplexed data.

As described above, the motion picture encoding method or the motion picture decoding method as shown in each of the exemplary embodiments can be used for any one of the devices and the systems explained above. In such a way, the effects explained in each of the exemplary embodiments can be obtained.

The present disclosure is not limited to the exemplary embodiment explained above, and various modifications and changes can be made without deviating from the scope of the present disclosure.

THIRD EXEMPLARY EMBODIMENT

Video data can also be generated by appropriately switching, as necessary, the motion picture encoding method or the apparatus as shown in each of the exemplary embodiments and the motion picture encoding method or the apparatus based on a different standard such as MPEG-2, MPEG4-AVC, or VC-1.

In this case, in a case where a plurality of pieces of video data based on different standards are generated, it is necessary to select a decoding method corresponding to each of the standards at the time of decoding. However, because which standard the video data to be decoded is based on is not identifiable, there is a problem in that it is impossible to select an appropriate decoding method.

In order to solve this problem, the multiplexed data obtained by multiplexing audio data and the like with video data is configured to include identification information indicating which standard the video data are based on. A specific configuration of multiplexed data including video data generated by the motion picture encoding method or the apparatus as shown in each of the exemplary embodiments will be explained below. The multiplexed data is a digital stream in MPEG-2 transport stream format.

FIG. 22 is a diagram illustrating a configuration of multiplexed data. As illustrated in FIG. 22, the multiplexed data is obtained by multiplexing one or more of the video stream, the audio stream, the presentation graphics stream (PG), and the interactive graphics stream. The video stream represents main video and sub video of a movie, the audio stream (IG) represents main audio portion of the movie and sub audio mixed with the main audio, and the presentation graphics stream represents subtitles of the movie. In this case, the main video indicates a normal video displayed on a screen, and the sub video indicates video displayed on a small screen in the main video. The interactive graphics stream indicates an interactive screen generated by arranging GUI components on the screen. The video stream is encoded by the motion picture encoding method or the apparatus as shown in each of the exemplary embodiments and the motion picture encoding method or the apparatus based on standards such as conventional MPEG-2, MPEG4-AVC, VC-1, or the like. The audio stream is encoded in accordance with methods such as Dolby AC-3, Dolby Digital Plus, MLP, DTS, DTS-HD, or linear PCM.

Each stream included in the multiplexed data is identified by a PID. For example, 0x1011 is allocated to the video stream used for the video of the movie, 0x1100 to 0x111F are allocated to the audio stream, 0x1200 to 0x121F are allocated to the presentation graphics, 0x1400 to 0x141F are allocated to the interactive graphics stream, and 0x1B00 to 0x1B1F are allocated to the video stream used for the sub video of the movie, and 0x1A00 to 0x1A1F are allocated to the audio stream used for the sub audio mixed with the main audio.

Figure 23:
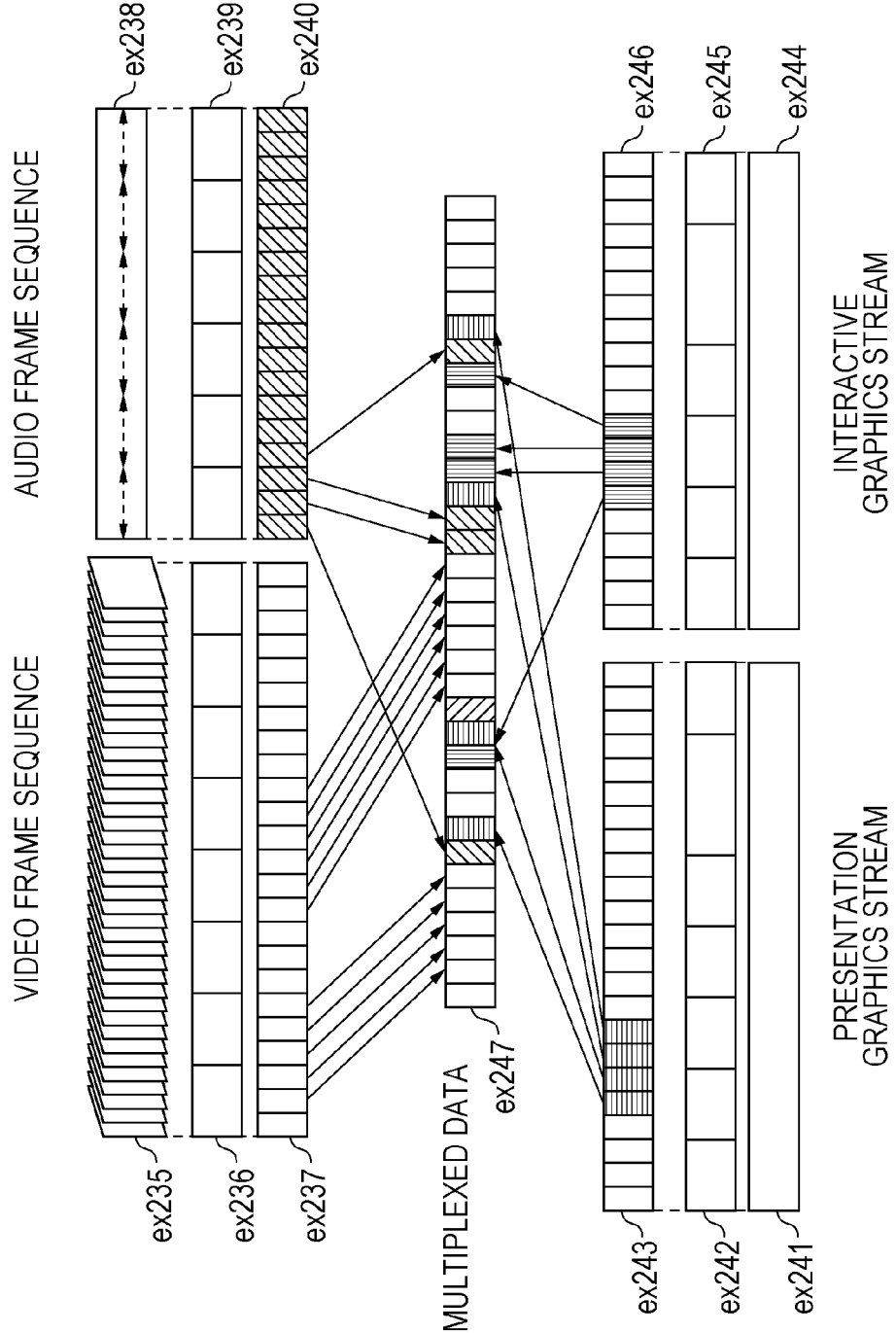
FIG. 23 is a diagram schematically illustrating how individual streams are multiplexed into multiplexed data.

FIG. 23 is a diagram schematically illustrating how the multiplexed data is multiplexed. First, video stream ex235 including a plurality of video frames and audio stream ex238 including a plurality of audio frames are converted into PES packet sequences ex236 and ex239, and converted into TS packets ex237 and ex240. Likewise, the data of presentation graphics stream ex241 and the interactive graphics ex244 are converted into PES packet sequences ex242 and ex245, and further converted into TS packets ex243 and ex246. The multiplexed data ex247 is formed by multiplexing these TS packets into a single stream.

Figure 24:
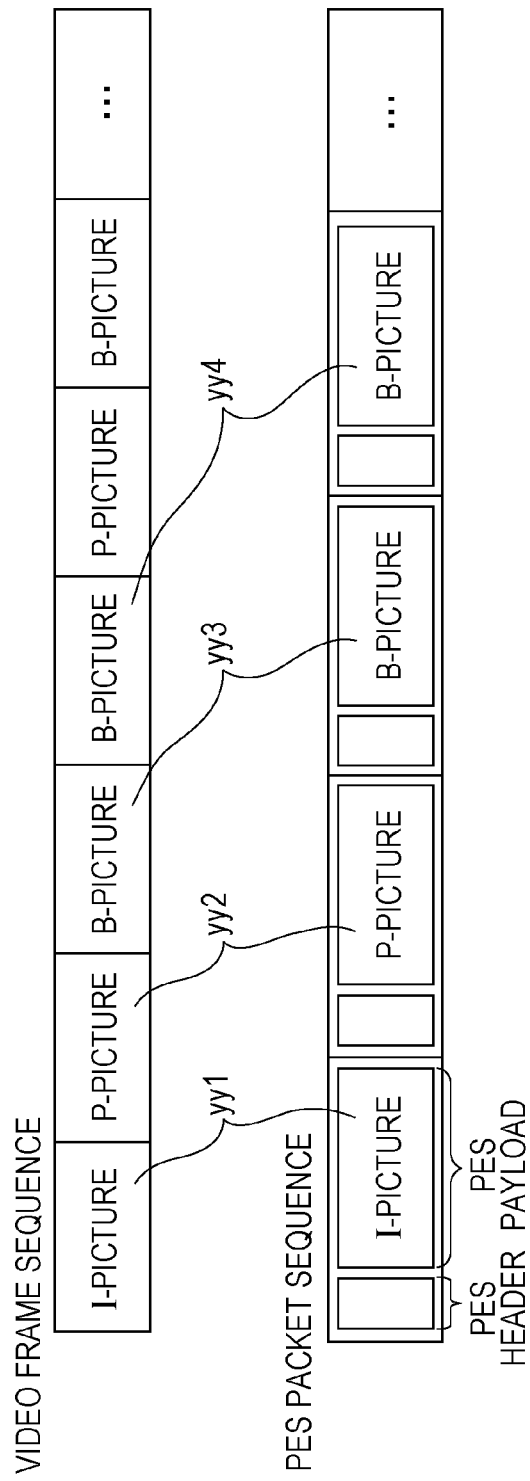
FIG. 24 is a diagram illustrating how a video stream is stored in a PES (Packetized Elementary Stream) packet sequence in a more detailed manner.

FIG. 24 illustrates, in more detail, how the video stream is stored in the PES packet sequence. In FIG. 24, the first stage illustrates a video frame sequence of the video stream. The second stage illustrates a PES packet sequence. As shown by arrows yy1, yy2, yy3, and yy4 of FIG. 24, the I picture, the B picture, the P picture which are a plurality of Video Presentation Units in the video stream are divided for each picture, and are stored in the payloads of the PES packets. Each PES packet has a PES header, and the PES header stores a PTS (Presentation Time-Stamp) which is a display time of a picture and a DTS (Decoding Time-Stamp) which is a decoding time of a picture.

Figure 25:
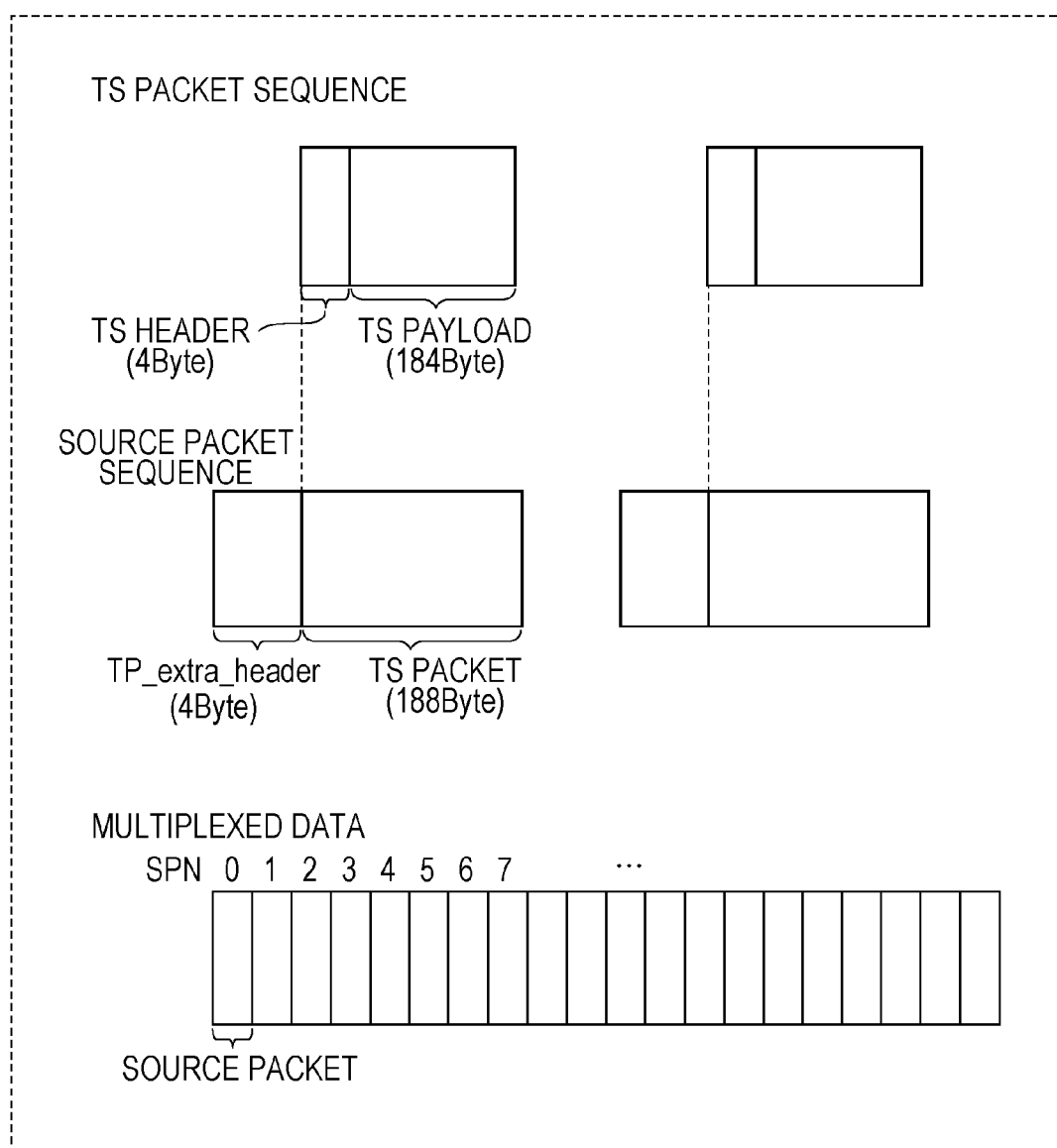
FIG. 25 is a diagram illustrating structures of a TS (Transport Stream) packet and a source packet in multiplexed data.

FIG. 25 illustrates a format of a TS packet ultimately written to multiplexed data. The TS packet is a packet having a fixed length of 188 Bytes constituted by a TS header of 4 Bytes having information about a PID and the like for identifying a stream and a TS payload of 184 Bytes for storing data, and the PES packet is divided and stored in the TS payload. In the case of BD-ROM, TP_Extra_Header of 4 Bytes is given to the TS packet, so that a source packet of 192 Bytes is made and written to multiplexed data. In TP_Extra_Header, information such as ATS (Arrival_Time_Stamp) is described. ATS indicates a transfer start time for a PID filter of a decoder of the TS packet. In the multiplexed data, the source packets are arranged as shown in the lower stage of FIG. 25, and a number that is increased from the head of the multiplexed data is called an SPN (source packet number).

The TS packets included in the multiplexed data include not only the streams such as video, audio, subtitle, and the like but also PAT (Program Association Table), PMT (Program Map Table), PCR (Program Clock Reference), and the like. The PAT indicates what is the PID of the PMT used in the multiplexed data, and the PID of the PAT itself is registered as zero. The PMT has the PIDs of the streams such as video, audio, subtitle, and the like included in the multiplexed data and attribute information about the stream corresponding to each PID, and includes various kinds of descriptors about the multiplexed data. The descriptor includes copy control information for designating permission or prohibition of copy of the multiplexed data. In order to maintain synchronization between the ATC (Arrival Time Clock) which is the temporal axis of the ATS and the STC (System Time Clock) which is the temporal axis of the PTS and the DTS, the PCR has information about the STC time corresponding to the ATS when the PCR packet is transferred to the decoder.

Figure 26:
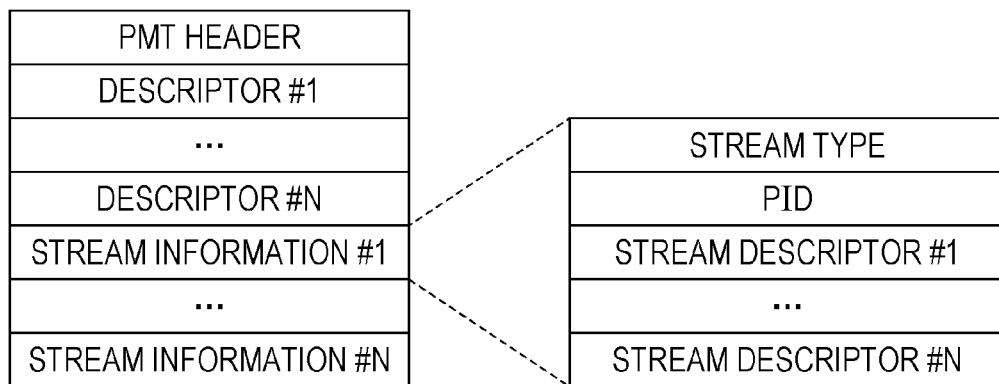
FIG. 26 is a diagram illustrating a data configuration of a PMT (Program Map Table)

FIG. 26 is a diagram for explaining the data structure of the PMT in detail. Leading picture of the PMT, a PMT header describing the length of data included in the PMT is disposed. After the PMT header, multiple descriptors about the multiplexed data are disposed. The above copy control information and the like is described as the descriptor. After the descriptor, multiple pieces of stream information about the streams included in the multiplexed data are disposed. The stream information is made up of a stream type for identifying a compression codec and the like of the stream, a PID of the stream, and a stream descriptor describing attribute information about the stream (such as a frame rate and an aspect ratio). There are as many stream descriptors as the number of streams existing in the multiplexed data.

In the case where the multiplexed data is recorded on a recording medium or the like, the multiplexed data is recorded together with the multiplexed data information file.

Figure 27:
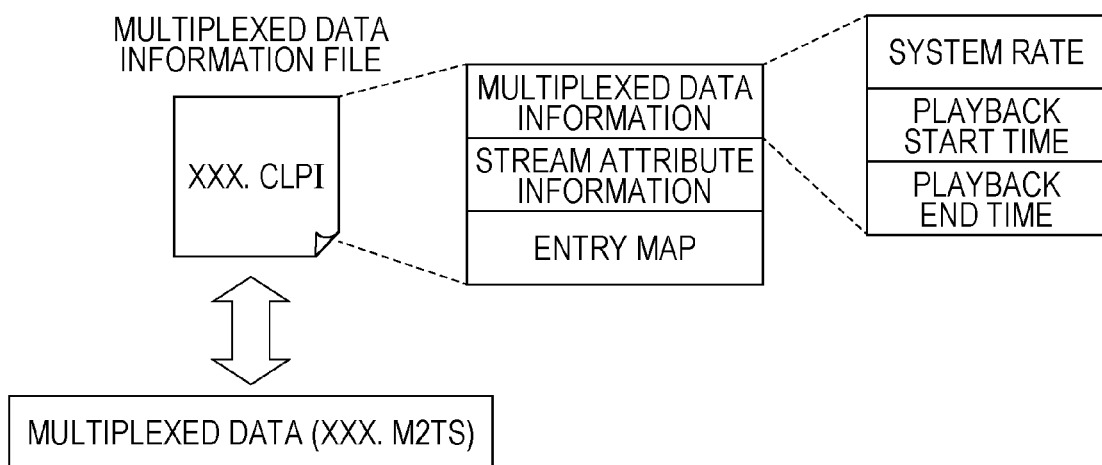
FIG. 27 is a diagram illustrating an internal configuration of multiplexed data information.

As illustrated in FIG. 27, the multiplexed data information file is management information about the multiplexed data, and corresponds to the multiplexed data in one-to-one manner, and is made up of multiplexed data information, stream attribute information, and an entry map.

As illustrated in FIG. 27, the multiplexed data information is made up of a system rate, a playback start time, and a playback end time. The system rate indicates a maximum transfer rate of multiplexed data to a PID filter of a system target decoder explained later. The interval of the ATS included in the multiplexed data is set to be equal to or less than the system rate. The playback start time is set to a PTS of a video frame leading picture of the multiplexed data, and the playback end time is set to a value obtained by adding a playback interval of one frame to the PTS of the video frame at the end of the multiplexed data.

Figure 28:
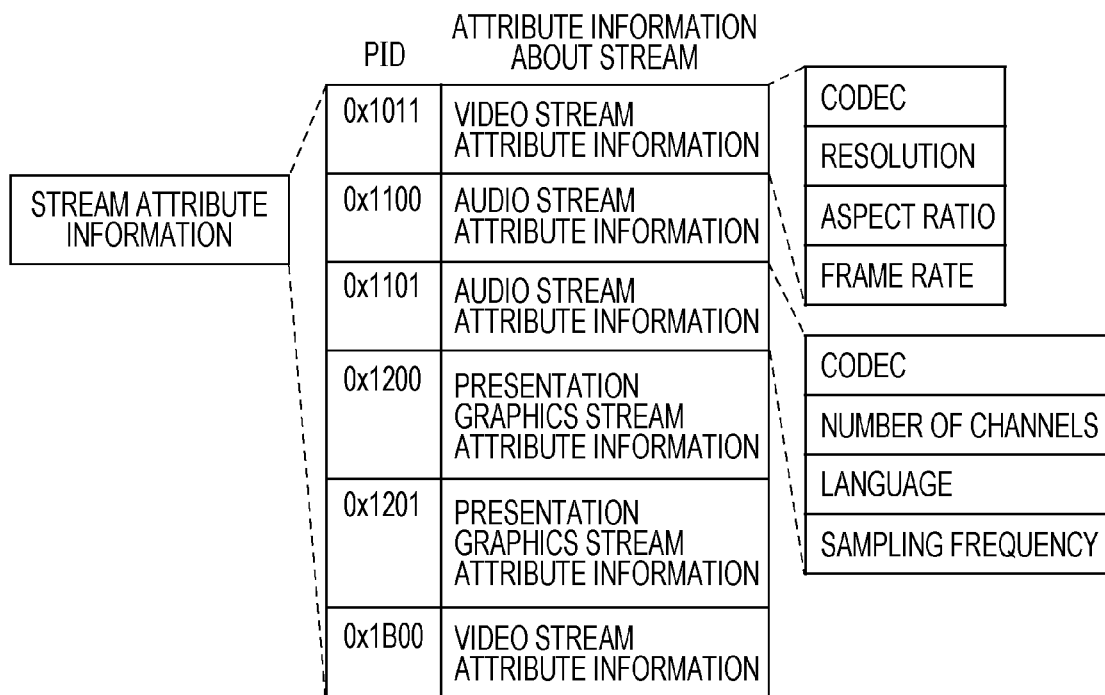
FIG. 28 is a diagram illustrating an internal configuration of stream attribute information.

As illustrated in FIG. 28, in the stream attribute information, attribute information about each stream included in the multiplexed data is registered for each PID. The attribute information has information that is different for each of the video stream, the audio stream, the presentation graphics stream, and the interactive graphics stream. The video stream attribute information has information such as what kind of compression codec is used to compress the video stream, what is the resolution of each of the picture data constituting the video stream, what is the aspect ratio, and what is the frame rate. The audio stream attribute information has information such as what kind of compression codec is used to compress the audio stream, how many channels are included in the audio stream, what language is supported, and what is the sampling frequency. The above information is used to initialize a decoder before the player performs reproduction.

In the present exemplary embodiment, from among the multiplexed data, a stream type included in a PMT is used. In a case where the multiplexed data is recorded on the recording medium, the video stream attribute information included in the multiplexed data information is used. More specifically, in the motion picture encoding method or the apparatus as shown in each of the exemplary embodiments, a step or means is provided to set unique information indicating video data generated by the motion picture encoding method or the apparatus as shown in each of the exemplary embodiments for the stream type or the video stream attribute information included in the PMT. According to this configuration, video data generated by the motion picture encoding method or the apparatus as shown in each of the exemplary embodiments and video data based on another standard can be identified.

Figure 29:
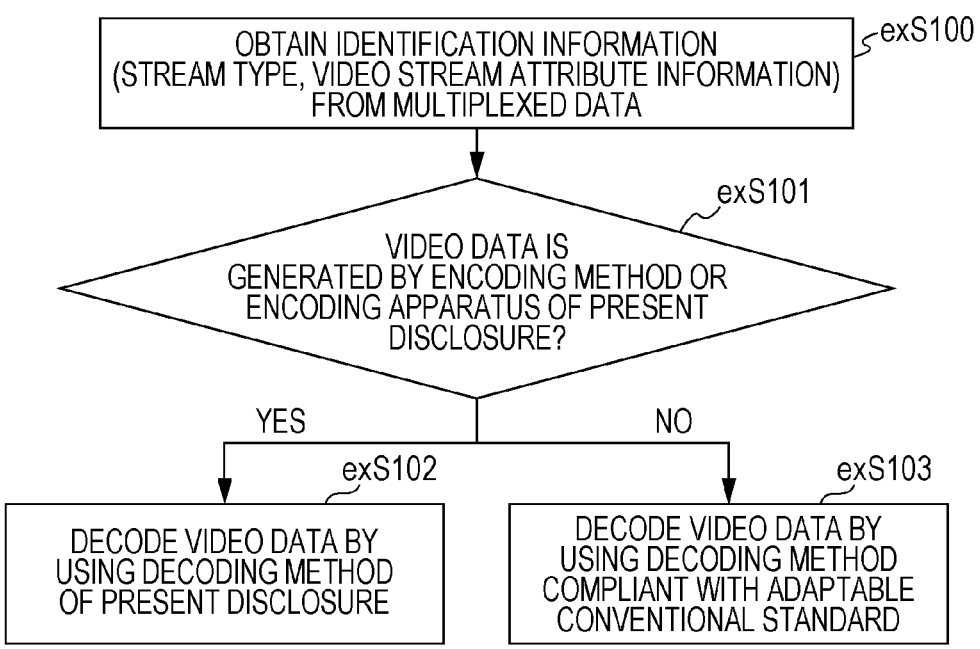
FIG. 29 is a diagram illustrating steps of identifying video data.

FIG. 29 illustrates steps included in the motion picture decoding method according to the present exemplary embodiment. In step exS100, the stream type included in the PMT or the video stream attribute information included in the multiplexed data information is obtained from the multiplexed data. Subsequently, in step exS101, a determination is made as to whether the stream type or the video stream attribute information indicates multiplexed data generated by the motion picture encoding method or the apparatus as shown in each of the exemplary embodiments. Then, in a case where the stream type or the video stream attribute information is determined to be generated by the motion picture encoding method or the apparatus as shown in each of the exemplary embodiments, decoding is performed by the motion picture decoding method as shown in each of the exemplary embodiments in step exS102. In a case where the stream type or the video stream attribute information indicates that it is based on standards such as conventional MPEG-2, MPEG4-AVC, or VC-1, the decoding is performed in accordance with the motion picture decoding method based on the conventional standard in step exS103.

As described above, by setting a new unique value for the stream type or the video stream attribute information, a determination can be made as to whether the decoding can be performed by the motion picture decoding method or the apparatus as shown in each of the exemplary embodiments when the decoding is performed. Therefore, even in a case where multiplexed data based on different standards is input, an appropriate decoding method or apparatus can be selected, and therefore, decoding can be performed without causing any error. The motion picture encoding method or the apparatus, or the motion picture decoding method or the apparatus as shown in the present exemplary embodiment can also be used for any of the devices and the systems explained above.

FOURTH EXEMPLARY EMBODIMENT

Figure 30:
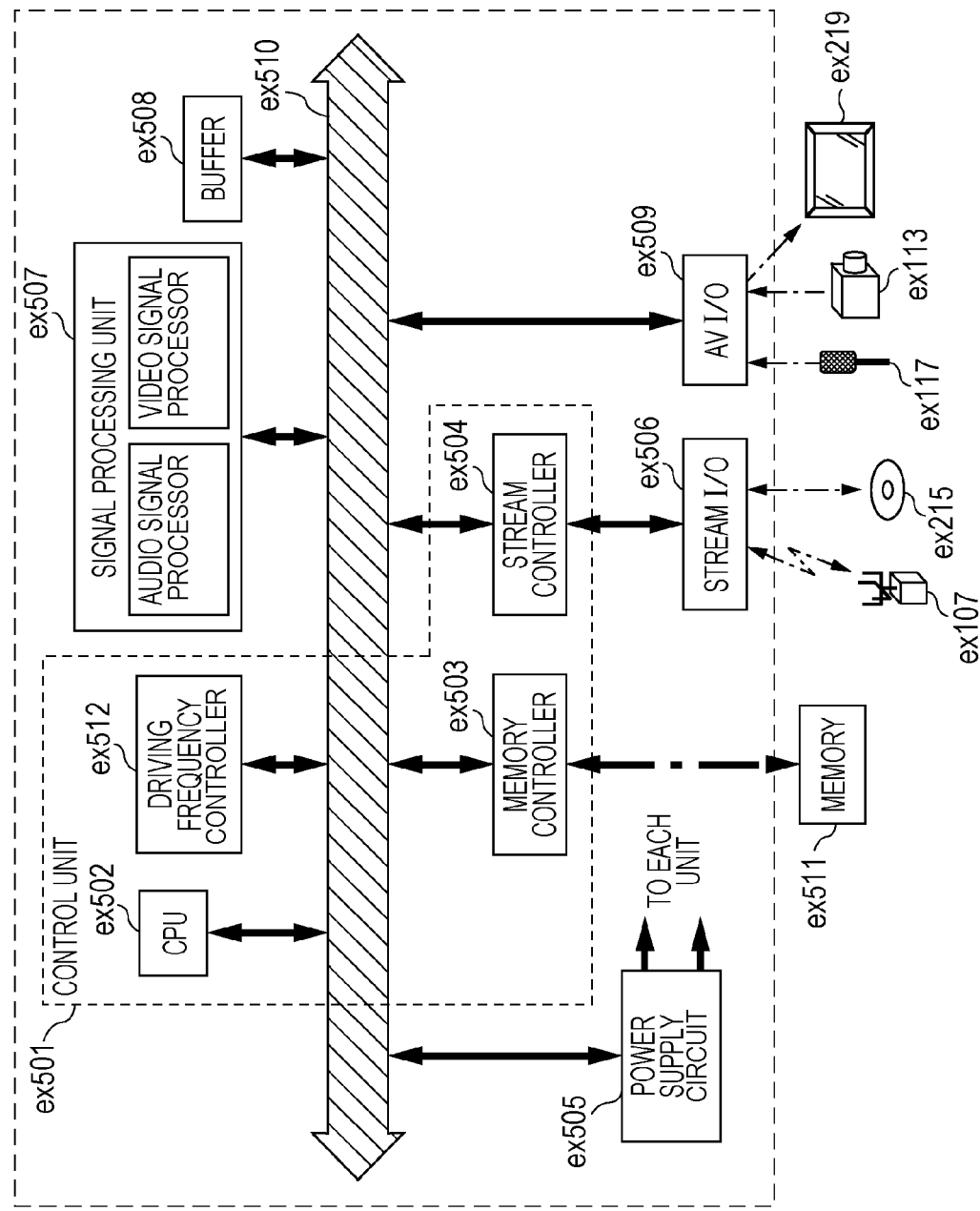
FIG. 30 is a block diagram illustrating an example of a configuration an integrated circuit that implements a motion picture encoding method and a motion picture decoding method according to each of the exemplary embodiments.

The motion picture encoding method and the apparatus and the motion picture decoding method and the apparatus as shown in each of the exemplary embodiments are typically implemented using an LSI which is an integrated circuit. FIG. 30 illustrates an example of a configuration of LSI ex500 which is formed as one chip. LSI ex500 includes elements ex501, ex502, ex503, ex504, ex505, ex506, ex507, ex508, and ex509 explained below, and each element is connected via bus ex510. Power supply circuit ex505 provides electric power to each unit to activate each unit in an operable state in a case where the power supply is in the ON state.

For example, in a case where the encoding processing is performed, LSI ex500 inputs an AV signal from microphone ex117, camera ex113, and the like with AV I/O ex509 on the basis a control performed by controller ex501 having CPU ex502, memory controller ex503, stream controller ex504, driving frequency controller ex512, and the like. The AV signal which has been input is temporarily accumulated in external memory ex511 such as an SDRAM. On the basis of control performed by controller ex501, the accumulated data is divided multiple times as necessary in accordance with the amount of processing and the processing speed, and are sent to signal processor ex507, and encoding of the audio signal and/or encoding of the video signal are performed in signal processor ex507. In this case, the encoding processing of the video signal is the encoding processing explained in each of the exemplary embodiments. Signal processor ex507 further performs processing, for example, multiplexing encoded audio data and encoded video data in some cases, and outputs the data from stream I/O ex506 to the outside. The multiplexed data thus output is transmitted to base station ex107, or written to recording medium ex215. It should be noted that, when multiplexing, the audio data and the video data are may be temporarily accumulated in buffer ex508 such that these pieces of data are synchronized with each other.

In the case, memory ex511 is explained as a configuration provided outside of LSI ex500. Alternatively, memory ex511 may be configured to be included in the inside of LSI ex500. The number of buffers ex508 is not limited to one and a plurality of buffers may be provided. LSI ex500 may be formed as one chip or multiple chips.

In the explanation, controller ex501 includes CPU ex502, memory controller ex503, stream controller ex504, driving frequency controller ex512, and the like, but the configuration of controller ex501 is not limited to this configuration. For example, signal processor ex507 may be configured to further include a CPU. By additionally providing a CPU in the inside of signal processor ex507, the processing speed can be further improved. As another example, CPU ex502 may be configured to include signal processor ex507 or, for example, an audio signal processor which is a part of signal processor ex507. In such case, controller ex501 is configured to include signal processor ex507 or CPU ex502 which is a part thereof.

In this case, LSI is employed, but depending on the degree of integration, it may also be referred to as an IC, a system LSI, a super LSI, and an ultra LSI.

The method of making integrated circuit is not limited to the LSI. Alternatively, it may be implemented using with a dedicated circuit or a generally-purpose processor. An FPGA (Field Programmable Gate Array) that can be programmed after an LSI is produced or a reconfigurable processor that can reconfigure connection and settings of the circuit cells in the LSI may also be used.

Furthermore, when there is a progress made in the semiconductor technique or with the advent of the technique of making an integration circuit that replaces the LSI with another accompanying technique, it is to be understood that the functional blocks may be integrated by using such techniques. An application of biotechnology and the like is considered to be possible.

FIFTH EXEMPLARY EMBODIMENT

The amount of processing is considered to be higher in a case where video data generated by the motion picture encoding method or the apparatus as shown in each of the exemplary embodiments is decoded than in a case where video data based on standards such as conventional MPEG-2, MPEG4-AVC, or VC-1 are decoded. For this reason, in LSI ex500, it is necessary to set a driving frequency higher than a driving frequency of CPU ex502 for decoding video data based on conventional standards. However, when the driving frequency is set at a higher level, there is a problem in that the consumed electric power increases.

Figure 31:
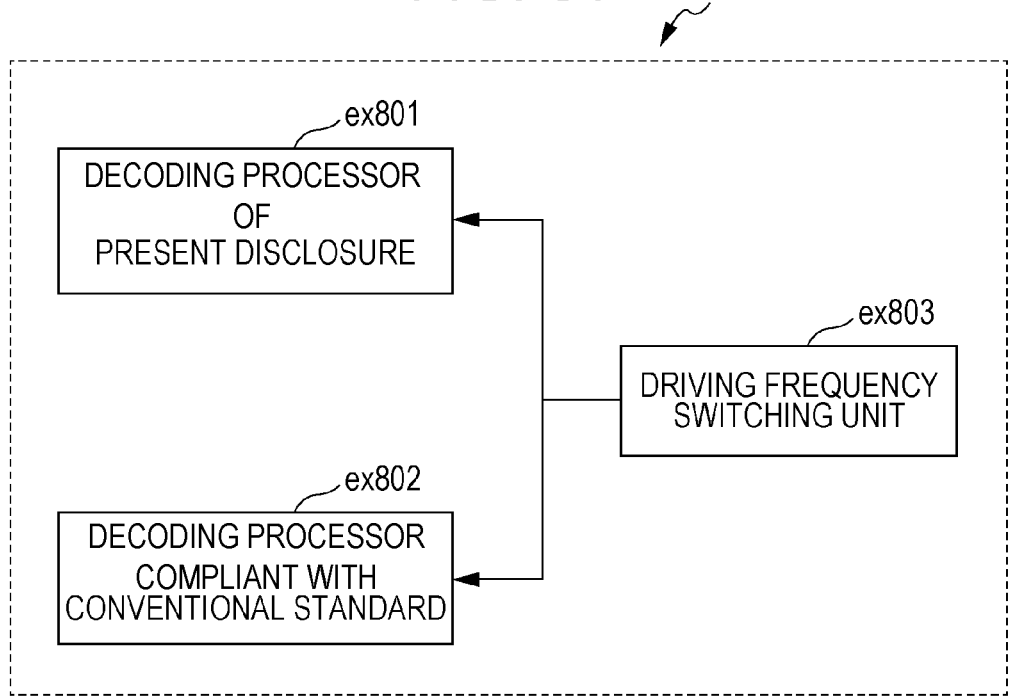
FIG. 31 is a diagram illustrating a configuration for switching a driving frequency.

In order to solve this problem, a motion picture decoding apparatus such as television set ex300 or LSI ex500 is configured to identify a standard which the video data is based on, and to switch between the driving frequencies in accordance with the standard. FIG. 31 illustrates a configuration ex800 in the present exemplary embodiment. Driving frequency switching unit ex803 sets a higher driving frequency in a case where the video data is generated by the motion picture encoding method or the apparatus as shown in each of the exemplary embodiments. Then, driving frequency switching unit ex803 instructs decoding processor ex801 executing the motion picture decoding method as shown in each of the exemplary embodiments to decode video data. On the other hand, in a case where the video data is video data based on the conventional standard, driving frequency switching unit ex803 sets the driving frequency is set to be lower than a case where the video data is generated by the motion picture encoding method or the apparatus as shown in each of the exemplary embodiments. Then, driving frequency switching unit ex803 instructs decoding processor ex802 based on the conventional standard to decode the video data.

More specifically, driving frequency switching unit ex803 includes CPU ex502 and driving frequency controller ex512 of FIG. 30. Decoding processor ex801, decoding processor ex801 executing the motion picture decoding method as shown in each of the exemplary embodiments and decoding processor ex802 based on the conventional standards correspond to signal processor ex507 of FIG. 30. CPU ex502 identifies which standard the video data is based on. Then, driving frequency controller ex512 sets the driving frequency on the basis of the signal from CPU ex502. On the basis of the signal from CPU ex502, signal processor ex507 decodes the video data. In this case, in order to identify video data, for example, the identification information described in the third exemplary embodiment is considered to be used. The identification information is not limited to one described in the third exemplary embodiment, and may be information that can identify which standard the video data is based on. For example, in a case where which standard the video data is based on can be identified on the basis of an external signal for identifying whether the video data are used for a television set or used for a disk, the identification can be made on the basis of such external signal. The selection of the driving frequency of CPU ex502 is considered to be performed on the basis of, for example, a lookup table in which a standard of video data as illustrated in FIG. 33 and a driving frequency are associated with each other. When the lookup table is stored in an internal memory of the LSI or buffer ex508, CPU ex502 can select the driving frequency by referring to the lookup table.

Figure 32:
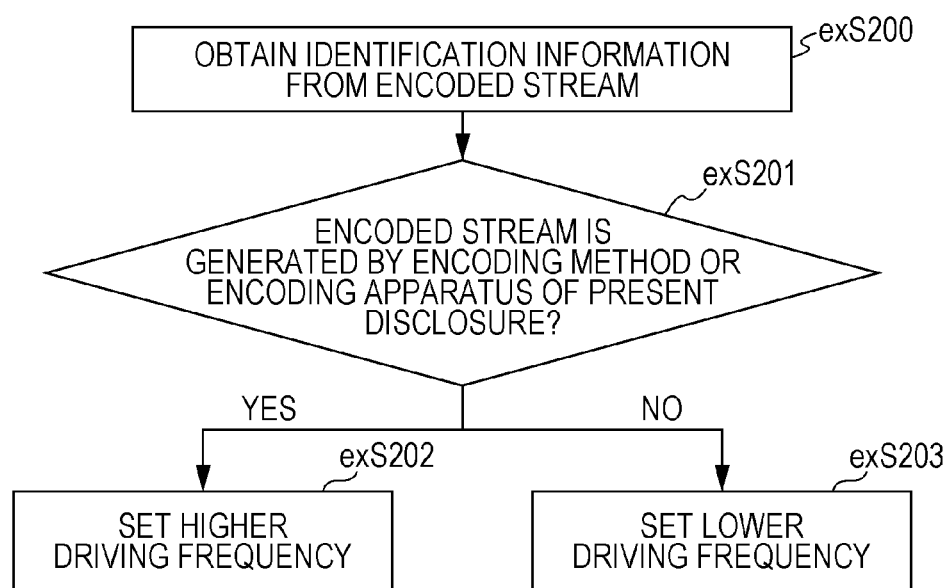
FIG. 32 is a diagram illustrating steps of identifying video data and switching a driving frequency.

FIG. 32 illustrates steps for performing the method of the present exemplary embodiment. First, in step exS200, signal processor ex507 obtains identification information from the multiplexed data. Subsequently, in step exS201, CPU ex502 identifies, on the basis of the identification information, whether or not the video data is generated by the encoding method or the apparatus as shown in each of the exemplary embodiments. In a case where the video data is determined to be generated by the encoding method or the apparatus as shown in each of the exemplary embodiments, CPU ex502 sends a signal for setting a higher driving frequency to driving frequency controller ex512 in step exS202. Then, with driving frequency controller ex512, higher driving frequency is set. On the other hand, in a case where the video data indicates video data based on standards such as conventional MPEG-2, MPEG4-AVC, or VC-1, CPU ex502 sends a signal for setting a lower driving frequency to driving frequency controller ex512 in step exS203. Then, driving frequency controller ex512 sets a driving frequency lower than that for a case where the video data is generated by the encoding method or the apparatus as shown in each of the exemplary embodiments.

Further, when a voltage given to the apparatus including LSI ex500 or LSI ex500 is changed in synchronization with switching of the driving frequency, the effect of saving the electric power can be further improved. For example, in a case where the driving frequency is set to be low, the voltage given to the apparatus including LSI ex500 or LSI ex500 is considered to be accordingly set to be lower than that for the case where the driving frequency is set to be higher.

In the setting method of the driving frequency, the driving frequency may be set to be higher in a case where the amount of processing during decoding is high, and the driving frequency may be set to be lower in a case where the amount of processing during decoding is low, and the setting method of the driving frequency is not limited to the setting method explained above. For example, in a case where the amount of processing for decoding the video data based on the MPEG4-AVC standard is more than the amount of processing for decoding the video data generated by the motion picture encoding method or the apparatus as shown in each of the exemplary embodiments, the setting of the driving frequency may be made oppositely to the case described above.

Further, the setting method of the driving frequency is not limited to the configuration for reducing the driving frequency. For example, in a case where the identification information indicates video data generated by the motion picture encoding method or the apparatus as shown in each of the exemplary embodiments, a voltage given to the apparatus including LSI ex500 or LSI ex500 is considered to be set higher, and, in a case where the identification information indicates video data based on standards of conventional MPEG-2, MPEG4-AVC, VC-1, or the like, the voltage given to the apparatus including LSI ex500 or LSI ex500 is considered to be set lower. In another example, in a case where the identification information indicates video data generated by the motion picture encoding method or the apparatus as shown in each of the exemplary embodiments, the driving of CPU ex502 is considered not to be stopped, and in a case where the identification information indicates s video data based on standards of conventional MPEG-2, MPEG4-AVC, VC-1, or the like, there is a margin in the processing, and therefore, driving of CPU ex502 is considered to be temporarily stopped. If there is a margin in the processing even in the case where the identification information indicates video data generated by the motion picture encoding method or the apparatus as shown in each of the exemplary embodiments, driving of CPU ex502 is considered to be stopped temporarily. In this case, the stop time can be set to be shorter than that for the case where the identification information indicates s video data based on standards of conventional MPEG-2, MPEG4-AVC, VC-1, or the like.

As described above, by switching the driving frequency in accordance with the standard which the video data is based on, the consumed electric power can be reduced. In a case where an apparatus including LSI ex500 or LSI ex500 is driven with a battery, the lifetime of the battery can be increased in accordance with the lower electric power consumption.

SIXTH EXEMPLARY EMBODIMENT

In some cases, a plurality of pieces of video data based on different standards may be input into the device and the system explained above, such as a television set and a mobile phone. As described above, in order to allow decoding even in a case where a plurality of pieces of video data based on different standards are input, signal processor ex507 of LSI ex500 needs to support the plurality of standards. However, when signal processor ex507 supporting the standards is used individually, the size of the circuit of LSI ex500 increases, and there is a problem in that the cost increases.

Figure 34A:
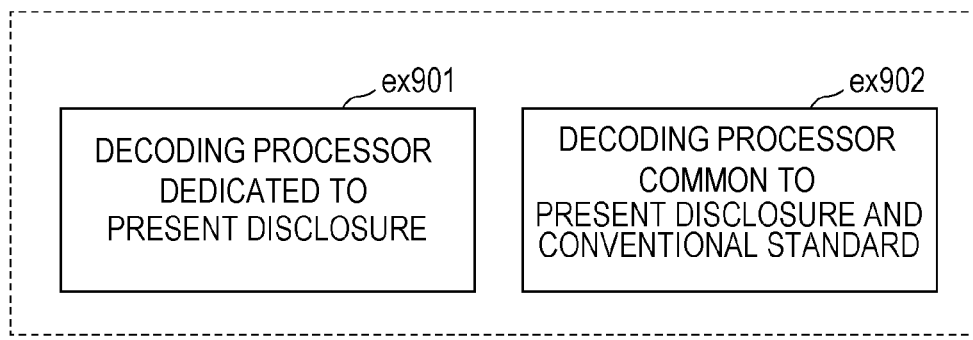
FIG. 34A is a diagram illustrating an example of a configuration for sharing a module of a signal processor.

In order to solve this problem, a decoding processor for executing the motion picture decoding method as shown in each of the exemplary embodiments and a decoding processor based on standards such as conventional MPEG-2, MPEG4-AVC, VC-1, or the like are configured to be partially made to be shared. An example of this configuration is shown in ex900 of FIG. 34A. For example, in the motion picture decoding method as shown in each of the exemplary embodiments and the motion picture decoding method based on MPEG4-AVC standard, some of the contents of the processing are the same in processing such as entropy encoding, inverse quantization, deblocking filtering, and motion compensation. For the same contents of the processing, decoding processor ex902 supporting the MPEG4-AVC standard is considered to be shared, and for the other contents of the processing which does not support the MPEG4-AVC standard and which is unique to an aspect of the present disclosure, dedicated decoding processor ex901 is considered to be used. To share the decoding processor, the decoding processor for executing the motion picture decoding method as shown in each of the exemplary embodiments may be configured to be shared for the same contents of the processing, and the dedicated decoding processor may be configured to be used for the contents of the processing unique to the MPEG4-AVC standard.

Figure 34B:
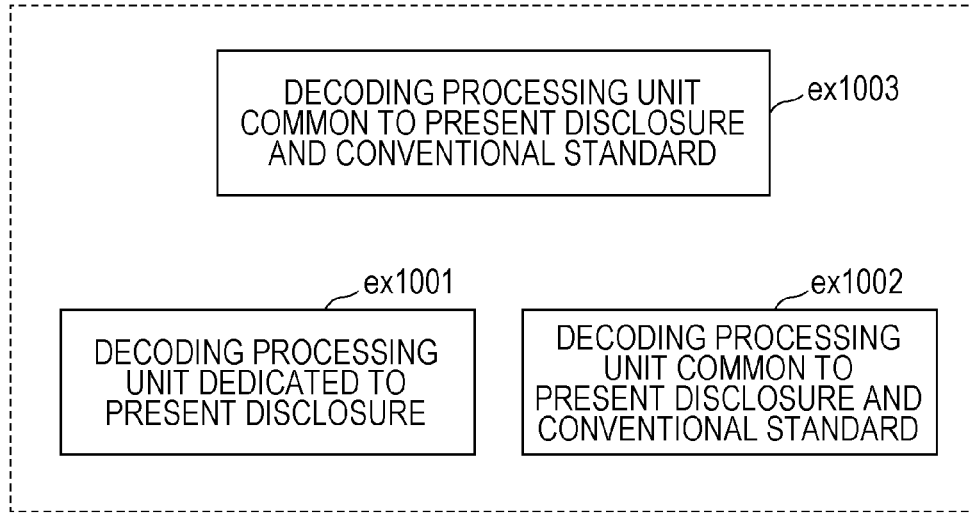
FIG. 34B is a diagram illustrating another example of a configuration for sharing a module of a signal processor.

Another example for partially sharing the processing is shown in ex1000 of FIG. 34B. In this example, dedicated decoding processor ex1001 supporting the contents of the processing unique to an aspect of the present disclosure, dedicated decoding processor ex1002 supporting the contents of the processing unique to another conventional standard, and shared decoding processor ex1003 supporting the contents of the processing which are common to the motion picture decoding method according to an aspect of the present disclosure and the motion picture decoding method of another conventional standard are configured to be used. In this case, dedicated decoding processors ex1001 and ex1002 are not necessarily specialized in the contents of the processing unique to an aspect of the present disclosure or another conventional standard, and may be capable of executing other generally-purpose processing. The configuration of the present exemplary embodiment may be implemented using LSI ex500.

As described above, the decoding processor is made to be shared for the contents of the processing that are common to the motion picture decoding method according to an aspect of the present disclosure and the motion picture decoding method of a conventional standard, so that the size of the circuit of the LSI can be reduced, and the cost can be reduced.

As described above, the image encoding method and the image decoding method according to an aspect or a plurality of aspects have be explained on the basis of the exemplary embodiments, but the present disclosure is not limited to the exemplary embodiments. An exemplary embodiment made by applying various kinds of modifications that are conceived by a person skilled in the art to the present exemplary embodiment and a form structured by combining constituent elements according to different exemplary embodiments may be included in the scope of an aspect or a plurality of aspects as long as they do not deviate from the gist of the present disclosure.

The present disclosure can be applied to, for example, an image encoding apparatus, an image decoding apparatus, and the like, and more specifically, the present disclosure can be used for information display devices, image capture devices, and the like such as a television set, a digital video

What is claimed is:

1. An image encoding method, performed by an encoding device, the image encoding method comprising:
    obtaining pictures arranged in display order, the pictures consisting of first layer pictures and second layer pictures;
    associating the pictures with Temporal IDs defined in a video coding standard such that the first layer pictures each are associated with a smallest Temporal ID and the second layer pictures each are associated with a largest Temporal ID;
    determining respective decoding timings of the pictures arranged in the display order such that (i) first decoding timings of the first layer pictures are spaced at respective regular intervals and that the first decoding timings do not depend on whether all of encoded pictures are to be decoded in a decoding device or only encoded pictures associated with the smallest Temporal ID are to be decoded in the decoding device, and that (ii) all pictures in each of random access units in the pictures are decoded without referring to any picture in any other random access unit, the all pictures not including a picture located before a head picture in the display order, the head picture being located at a head in decoding order in the random access unit;
    encoding the pictures arranged in encoding order according to the decoding timings to generate the encoded pictures consisting of encoded first layer pictures and encoded second layer pictures, the encoding order corresponding to the decoding timings and being different from the display order; and
    generating an encoded stream including the encoded first layer pictures, the encoded second layer pictures, and the decoding timings.

2. An image decoding method, performed by a decoding device, the image decoding method comprising:
    obtaining, from an encoded stream, encoded pictures consisting of first layer pictures and second layer pictures, the encoded pictures associated with Temporal IDs defined in a video coding standard such that the first layer pictures each are associated with a smallest Temporal ID and the second layer pictures each are associated with a largest Temporal ID;
    obtaining, from the encoded stream, decoding timings of the encoded pictures that are determined such that (i) first decoding timings of the first layer pictures are spaced at respective regular intervals and that the first decoding timings do not depend on whether all of encoded pictures are to be decoded in the decoding device or only encoded pictures associated with the smallest Temporal ID are to be decoded in the decoding device, and that (ii) all pictures in each of random access units in the pictures are decoded without referring to any picture in any other random access unit, the all pictures not including a picture located before a head picture in display order, the head picture being located at a head in decoding order in the random access unit; and
    decoding the first layer pictures and the second layer pictures included in the encoded stream or only the first layer pictures arranged in the decoding order according to the decoding timings, the decoding order being different from the display order of the encoded pictures.

* * * * *